(12) United States Patent
Liu et al.

(10) Patent No.: US 10,230,961 B2
(45) Date of Patent: Mar. 12, 2019

(54) METHOD AND APPARATUS FOR TEMPLATE-BASED INTRA PREDICTION IN IMAGE AND VIDEO CODING

(71) Applicant: MEDIATEK INC., Hsin-Chu (TW)

(72) Inventors: Shan Liu, San Jose, CA (US); Jing Ye, San Jose, CA (US); Xiaozhong Xu, State College, PA (US); Tzu-Der Chuang, Zhubei (TW); Ching-Yeh Chen, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 88 days.

(21) Appl. No.: 15/611,841

(22) Filed: Jun. 2, 2017

(65) Prior Publication Data

US 2017/0353730 A1 Dec. 7, 2017

Related U.S. Application Data

(60) Provisional application No. 62/374,039, filed on Aug. 12, 2016, provisional application No. 62/365,403, filed on Jul. 22, 2016, provisional application No. 62/354,140, filed on Jun. 24, 2016, provisional application No. 62/345,074, filed on Jun. 3, 2016.

(51) Int. Cl.
| | |
|---|---|
| *H04N 19/159* | (2014.01) |
| *H04N 19/122* | (2014.01) |
| *H04N 19/70* | (2014.01) |
| *H04N 19/96* | (2014.01) |
| *H04N 19/105* | (2014.01) |
| *H04N 19/119* | (2014.01) |
| *H04N 19/11* | (2014.01) |
| *H04N 19/176* | (2014.01) |
| *H04N 19/182* | (2014.01) |

(52) U.S. Cl.
CPC ......... *H04N 19/159* (2014.11); *H04N 19/105* (2014.11); *H04N 19/11* (2014.11); *H04N 19/119* (2014.11); *H04N 19/122* (2014.11); *H04N 19/70* (2014.11); *H04N 19/96* (2014.11); *H04N 19/176* (2014.11); *H04N 19/182* (2014.11)

(58) Field of Classification Search
USPC .................................................. 375/240.12
See application file for complete search history.

(56) References Cited

U.S. PATENT DOCUMENTS

2011/0261882 A1   10/2011   Zheng et al.

FOREIGN PATENT DOCUMENTS

TW           201110709 A        3/2011

*Primary Examiner* — Nguyen T Truong
(74) *Attorney, Agent, or Firm* — McClure, Qualey & Rodack, LLP

(57) ABSTRACT

A method and apparatus for video coding using template-based Intra prediction are disclosed. According to one method, where determining whether to apply the template-based Intra prediction or one or more parameters associated with the template-based Intra prediction depends on the current block size. According to yet another method, the quad-tree plus binary tree (QTBT) structure is used to partition an image or one or more areas of the current image into blocks. If the template-based Intra prediction is used for a current block and the current block is non-square, the width and height of the L-shaped reference pixel line are determined according to width and height of the current block. The L-shaped reference pixel line comprises a top reference pixel segment above the top template and a left reference pixel segment adjacent to a left side of the left template.

22 Claims, 19 Drawing Sheets

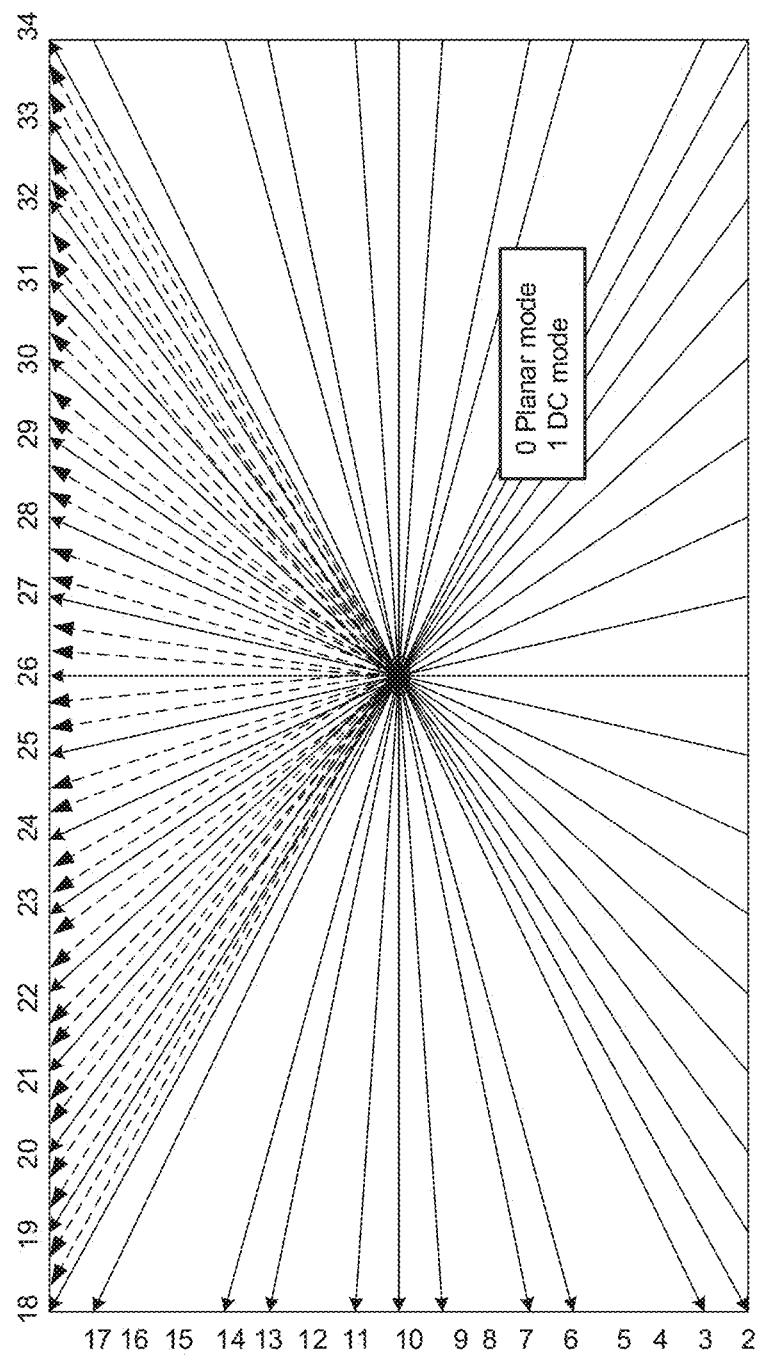

METHOD AND APPARATUS FOR TEMPLATE-BASED INTRA PREDICTION IN IMAGE AND VIDEO CODING

CROSS REFERENCE TO RELATED APPLICATIONS

The present invention claims priority to U.S. Provisional Patent Application Ser. No. 62/345,074, filed on Jun. 3, 2016, U.S. Provisional Patent Application Ser. No. 62/354,140, filed on Jun. 24, 2016, U.S. Provisional Patent Application Ser. No. 62/365,403, filed on Jul. 22, 2016 and U.S. Provisional Patent Application Ser. No. 62/374,039, filed on Aug. 12, 2016. The U.S. Provisional Patent Applications are hereby incorporated by reference in their entireties.

FIELD OF THE INVENTION

The present invention relates to template-based Intra prediction (also known as decoder side intra mode derivation, DIMD) in video coding. In particular, the present invention discloses various techniques to reduce the complexity or improve the coding efficiency associated with template-based Intra prediction.

BACKGROUND AND RELATED ART

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU (i.e., no splitting) or can be split into four smaller units of equal sizes (i.e., M/2×M/2 each), which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set).

Furthermore, according to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU, including 2N×2N, 2N×N, N×2N, N×N, 2N×nU, 2N×nD, nL×2N and nR×2N partition types. Unlike the CU, the PU may only be split once according to HEVC. The partitions shown in the second row correspond to asymmetric partitions, where the two partitioned parts have different sizes.

The HEVC coding comprises Inter prediction and Intra prediction. For Intra prediction, the generation of Intra prediction includes three parts: Intra smoothing filter, Intra prediction, and Intra gradient filter. At first, a smoothing operation is applied to the reference samples as a pre-processing step before calculating the prediction. This smoothing operation corresponds to applying an FIR-filter with filter weights [1, 2, 1]>>2, with low-pass characteristics to the samples belonging to the left column and the above row of the current TU (transform unit). The Intra prediction of each TU is produced with the reconstructed samples of neighboring TUs. The samples involved in Intra smoothing are indicated in FIG. 1, where block 100 corresponds to the current block, line 110 corresponds to a horizontal boundary and line 120 corresponds to a vertical boundary. Whether this smoothing operation is used is determined by the TU size and the Intra prediction mode. Second, the Intra prediction of current block is derived from neighboring reference samples with a certain Intra prediction mode, and the Intra prediction mode is selected from DC mode, planar mode, and 33 directional modes by encoder and signaled in the bitstream. Third, if the Intra prediction mode is DC, horizontal or vertical mode, Intra gradient filter is further applied to the samples at the left and top boundaries of the current TU.

Out of all 35 Intra prediction modes in HEVC, three modes are considered as most probable modes (MPM) for predicting the Intra prediction mode in current prediction block. For example, the Intra prediction modes used in the left prediction block and in the above prediction block can be used as candidates of the MPM set. In the case that the Intra prediction modes in two neighboring blocks are identical and both directional, or only one of the two neighboring blocks is available and coded in Intra prediction and at the same time this Intra prediction mode is directional, two neighboring directions immediately next to this direction is also used in MPM. DC mode and Planar mode are also considered in MPM set to fill the available spot in the MPM, especially if the above or top neighboring blocks are not available or not coded in Intra prediction, or the Intra prediction modes in neighboring blocks are not directional. If the Intra prediction mode for current prediction block is one of the modes in the MPM set, 1 or 2 bins is used to signal which one it is. Otherwise, it is not the same as any entry in the MPM set, it will be coded as a non-MPM mode. There are all-together 32 such non-MPM modes and a (5-bit) fixed length coding method is applied to signal this mode. The 33 directions are illustrated in FIG. 2. In FIG. 2, there are all together 33 directional modes, i.e., H, H+1, . . . , H+8, H−1, . . . , H−7, V, V+1, . . . , V+8, V−1, . . . , V−8. This system can be expanded to a general case, where horizontal and vertical modes are represented as H and V modes. For other directional modes, they can be represented either as H+k or V+k modes, where k=±1, ±2, etc. For example, if 65 directional modes are used as shown in FIG. 3, k can be range from ±1 to ±16.

In some recent development beyond HEVC, additional 32 directional modes are used in between the existing 33 directional modes, as shown in FIG. 3. In this case, there are a total 65 modes including directional modes as well as some non-directional modes.

In HEVC, once a directional mode is decided, along the prediction direction, all the pixels in the current block will use the same predictor value. If the predictor falls in between two reconstructed reference sample, a bi-linear filter will be used to calculate the predictor as a weighted average of the two neighboring pixels. For example, the predictor signal P can be derived according to P=[P1* a+P2*(32−α)]/32, where P1 and P2 are the two neighboring reconstructed samples, integer α is the distance from the predictor P to P2 with a range between 0 and 32, inclusively.

The concept of Intra gradient filter is to utilize the gradient information along the Intra prediction direction to improve the quality of Intra prediction. For the Intra prediction modes from vertical/horizontal directions (v/h) to vertical/horizontal +8 directions (v+8/h+8) as shown in FIG. 2, the left column/the above row neighboring samples can locate their corresponding references along the Intra prediction direction from the above row/the left column. The gradient calculated with the neighboring samples can be used to improve the Intra prediction. An example for the vertical directional mode is illustrated in FIG. 4A, where $P_{ij}$ denotes the predictor at row i and column j. AL represents the reconstructed sample at the left-above corner of the current block, while $L_i$ represents the reconstructed sample in the left column of the current block. A new predictor is calculated as $$P'ij=Pij+\alpha \cdot (Li-AL), \quad (1)$$

where α is a fraction from 0 to 1 and is selected according to j, such as α=½ for j=0, and α=¼ for j=1. $P'_{ij}$ is used as the final predictor. As for the horizontal directional mode, the final predictor $P'_{ij}$ is calculated as $$P'ij=Pij+\alpha \cdot (Aj-AL), \quad (2)$$

In the above equation, Aj is the reconstructed sample in the above row, which is shown in FIG. 4A. As for the directional modes v+1, ..., v+8 and h+1, ..., h+8, Li or Aj first obtains its corresponding reference sample RLi or RAj along the direction of Intra prediction. When RLi or RAj is not located at the position of integer pixel, they are produced by interpolation of integer pixels in the above row or the left column of the current block. The example of v+1, ..., v+8 directional modes is shown in FIG. 4B. The final predictor P'ij is calculated as $$P'ij=Pij+\alpha \cdot (Li-RLi). \quad (3)$$

Similar to the vertical directional mode, α is a fraction from 0 to 1 and is selected according to the direction of Intra prediction and j. As for h+1, ..., h+8 directional modes, the final predictor $P'_{ij}$ is calculated as $$P'ij=Pij+\alpha \cdot (Aj-RAj), \quad (4)$$

where α is a fraction from 0 to 1 and is selected according to the direction of Intra prediction and i.

The Intra gradient filter can be applied for all directional modes, i.e., v+1, ..., v+8 and h+1, ..., h+8 in HEVC. However, only when the Intra prediction mode is DC, horizontal or vertical mode, Intra gradient filter is used. If the Intra prediction is DC mode, the samples at the first row and first column are filtered by Intra gradient filter. If the Intra prediction is horizontal mode, then the samples at the first row are filtered by Intra gradient filter. If the Intra prediction is vertical mode, then the samples at the first column are further filtered by Intra gradient filter.

Besides Intra gradient filtering, another method called bi-directional Intra prediction is also proposed to improve the quality of Intra prediction in JCT-VC meetings. For diagonal Intra prediction modes, i.e. v+1, ..., v+8 and h+1, ..., h+8, a weighted sum of the reconstructed samples of the above row and the reconstructed samples from the left column along the direction is used as the Intra predictor. For example, for v+1, ..., v+8 directional modes, as illustrated in FIG. 5, Pij from the neighboring samples of above row has a corresponding reference sample Fij in the left column along the prediction direction. If Fij is not located at the integer pixel position, it can be generated by interpolating integer pixels in the left column. The final predictor $P'_{ij}$ is then calculated as the weighted sum of Pij and Fij as $$P'ij=\alpha \cdot Pij+(1-\alpha) \cdot Fij \quad (5)$$

where α is a fraction from 0 to 1 and is selected according to the direction of Intra prediction together with j (for v+1, ..., v+8 directional modes) or i (for h+1, ..., h+8 directional modes).

After generating Intra predictors, the prediction error is further processed by transform and quantization and encoded by entropy coding. For entropy coding, the quantized coefficients are divided into multiple 4×4 coefficient groups, first. The coding order of different coefficient groups and scan order of coefficients in one coefficient group is selected according to Intra prediction mode and transform size. If the transform size is smaller than or equal to 8×8, Intra-mode-dependent scan will be used for the coding order of different coefficient groups and scan order of coefficients in one coefficient group. Otherwise, diagonal scan is used for the coding order of different coefficient groups and scan order of coefficients in one coefficient group.

Also, it is possible to have weighted sum of several predictors to generate the final prediction signal for Intra prediction (namely multiple parameter Intra prediction or MPI). The final predictor $P_{MPI}[i, j]$ of position (i, j) is defined as follows:

$$P_{MPI}[i,j]=(\alpha P_{HEVC}[i,j]+\beta P_{MPI}[i-1,j]+\gamma P_{MPI}[i,j-1]+\delta P_{MPI}[i-1,j-1]+4)>>3,$$

where outside of the block $P_{MPI}[i, j]$ is equal to reconstructed signal as shown in FIG. 6, $$P_{MPI}[i,j]=REC[i,j], \text{ if } i<0\|j<0.$$

FIG. 6 illustrates an example of multiple parameter Intra prediction (MPI) process, where an input block is processed by Arbitrary Directional Intra (ADI) 610 followed by MPI 620. The strength of this post-processing (i.e., parameters α+β+γ+δ=8) is controlled on the CU level and signaled with up to 2 bits.

In an ITU-I contribution C1046 (A. Said, etc., "Position dependent Intra prediction combination," ITU-T SG16 COM 16-C1046-E, October 2015), a method is proposed to use a combination of filtered and unfiltered reference samples to form the final predictor p[x, y] as shown in FIG. 7 for unfiltered (710) and filtered (720) cases.

Signals r and s are used to represent the sequences with filtered and unfiltered references. The new prediction p[x, y] combines weighted values of boundary elements r[ ] with q[x, y] (i.e., predictor derived from filtered samples s[ ]) as following:

$$p[x,y]=\{(c_1^{(v)}>>\lfloor y/d \rfloor)r[x,-1]-(c_2^{(v)}>>\lfloor y/d \rfloor)r[-1,-1]+(c_1^{(h)}>>\lfloor x/d \rfloor)r[-1,y]-(c_2^{(h)}>>\lfloor x/d \rfloor)r[-1,-1]+b[x,y]q[x,y]+64\}>>7$$

where $c_1^v, c_2^v, c_1^h, c_2^h$ are stored prediction parameters, d=1 for block sizes up to 16×16, and d=2 for larger blocks, and $$b[x,y]=128-(c_1^{(v)}>>\lfloor y/d \rfloor)+(c_2^{(v)}>>\lfloor y/d \rfloor)-(c_1^{(h)}>>\lfloor y/d \rfloor)+(c_2^{(h)}>>\lfloor y/d \rfloor),$$

is a normalization factor.

In the contribution JVET-C-0061 (X. Xiu, etc., "Decoder-side Intra mode derivation", JVET-C0061, May, 2016), interpolation for Intra prediction using the planar mode is disclosed. According to JVET-C-0061, the sample at bottom-right corner current prediction block is either signaled or estimated using linear average of corresponding left reference sample and above reference sample). Accordingly, samples in the right most column and bottom row are bi-linearly interpolated using the top/bottom-right sample combination and the left/bottom-right sample combination (810) as shown in FIG. 8. The remaining pixels in the prediction block are predicted using similar bi-linear interpolation (820), as is shown in FIG. 8.

Template Based Intra Prediction

In the contribution JVET-C-0061, a decoder side Intra prediction mode derivation method is proposed, where the neighboring reconstructed samples of the current block are used as a template. Reconstructed pixels in the template are compared with the predicted pixels in the same corresponding positions. The predicted pixels are generated using the reference pixels, which are the neighboring reconstructed pixels around the template. For each of the possible Intra prediction modes, the encoder and decoder try to generate predicted pixels in the similar way as in HEVC for the positions in the template. The distortion between the predicted pixels and the reconstructed pixels in the template are compared and the recorded. The Intra prediction mode with minimum distortion is selected as the derived Intra prediction mode. During the template matching search, the available Intra prediction mode is increased to 129 (from 67) and the interpolation filter for reference sample is increased to $1/64$-pel (from $1/32$-pel). FIG. 9 illustrates an example of decoder side Intra mode derivation (DIMD), where L is the width and height of the template for both the pixels on the top of current block and to the left of current block (i.e., the Target block shown in FIG. 9).

Quadtree Plus Binary Tree (QTBT) Structure

In contribution m37524/COM16-C966 (J. An, et al., "Block partitioning structure for next generation video coding," MPEG doc. m37524 and ITU-T SG16 Doc. COM16-C966, October 2015), a quadtree plus binary tree (QTBT) block partitioning structure is disclosed. According to QTBT, a coding tree block (CTB) is firstly partitioned by a quadtree structure. The quadtree leaf nodes are further partitioned by a binary tree structure. The binary tree leaf nodes, namely coding blocks (CBs), are used for prediction and transform without any further partitioning. For P and B slices, the luma and chroma CTBs in one coding tree unit (CTU) share the same QTBT structure. For I slice, the luma CTB is partitioned into CBs by a QTBT structure, and two chroma CTBs are partitioned into chroma CBs by another QTBT structure.

A CTU (or CTB for I slice), which is the root node of a quadtree, is firstly partitioned by a quadtree, where the quadtree splitting of one node can be iterated until the node reaches the minimum allowed quadtree leaf node size (MinQTSize). If the quadtree leaf node size is not larger than the maximum allowed binary tree root node size (MaxBTSize), it can be further partitioned by a binary tree. The binary tree splitting of one node can be iterated until the node reaches the minimum allowed binary tree leaf node size (MinBTSize) or the maximum allowed binary tree depth (MaxBTDepth). The binary tree leaf node, namely CU (or CB for I slice), will be used for prediction (e.g. Intra-picture or inter-picture prediction) and transform without any further partitioning. There are two splitting types in the binary tree splitting: symmetric horizontal splitting and symmetric vertical splitting.

Block partitioning 1010 and corresponding QTBT structure 1020 of FIG. 10 illustrates an example of block partitioning by using QTBT. The solid lines indicate quadtree splitting and dotted lines indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For the quadtree splitting, there is no need to indicate the splitting type since it always splits a block horizontally and vertically into 4 sub-blocks of equal size.

In the above disclosure, JVET (joint video exploration team) refers to an international organization that has been established by both ITU-T VCEG and ISO/IEC MPEG to study the next generation video coding technologies. Reference software called JEM (joint exploration model) is built based on HEVC's reference software (HM). Some new video coding methods, including QTBT and 65 Intra prediction directions, are included in JEM software In order to reduce the complexity and/or increase the coding efficiency associated with DIMD, various techniques are disclosed.

BRIEF SUMMARY OF THE INVENTION

A method and apparatus for video coding using template-based Intra prediction are disclosed. According to one method, whether to apply the template-based Intra prediction to the current block or parameter(s) associated with the template-based Intra prediction to apply to the current block is determining according to block size associated with the current block. If the template-based Intra prediction is used for the current block, a target Intra mode or an Intra-mode candidate set is derived from a template matching candidate set for the current block using the template-based Intra prediction and the current block is encoded or decoded using Intra prediction with a current Intra mode selected from an Intra mode group comprising the target Intra mode or the Intra-mode candidate set.

In the above method, the parameter(s) associated with the template-based Intra prediction can be selected from a group comprising an Intra mode set searched by the template-based Intra prediction, a set size associated with the Intra mode set and a total number of iterations to apply the template-based Intra prediction.

In one embodiment, the template-based Intra prediction can be applied to the current block if the block size is greater than a minimum block size. For example, the template-based Intra prediction can be disabled for the current block if the current block is a 4×4 block. The block size can be measured as a longer side, a shorter side or an area of the current block.

In another embodiment, template-based Intra prediction with a total of 11 Intra modes can be applied to the current block if the current block is a 4×4 block. In yet another embodiment, when the current block is a 4×N or N×4 block with N being an integer greater than or equal to 8 and the template-based Intra prediction is applied to the current block; and wherein if a best Intra mode derived according to the template-based Intra prediction falls in a shorter side of the current block, only one-round of template-based Intra prediction is applied to the current block. In yet another embodiment, the total number of Intra modes searched by the template-based Intra prediction depends on the block size, where the block size is measured as a longer side, a shorter side or an area of the current block.

In another embodiment, different Intra mode sets are searched by the template-based Intra prediction according to a block length measured as a width, height, maximum of width and height, or minimum of width and height of the current block. For example, set sizes associated with the different Intra mode sets searched by the template-based Intra prediction can be 9, 33, 9 and 131 for the block length being 4, 8, 64 and other block lengths respectively.

In another embodiment, the Intra-mode candidate set consisting of N Intra-mode candidates are derived based on the template-based Intra prediction, and where the N Intra-mode candidates correspond to N lowest-cost Intra modes within an Intra mode set searched by the template-based Intra prediction. A final Intra mode can be selected for the current block from the N Intra-mode candidates by explicitly signaling or parsing a syntax corresponding to the final Intra mode.

In another embodiment, an initial Intra mode is signaled or parsed and the template-based Intra prediction derives a final Intra mode for the current block by searching a set of Intra modes around the initial Intra mode. In another embodiment, all available Intra modes for the current block are divided into groups and an index is signaled or parsed to select a group as an Intra mode set, and wherein a final Intra mode is determined from the Intra mode set by using the template-based Intra prediction to search the Intra mode set.

According to another method, N template matching candidates for the current block are determining from a group comprising first Intra modes of one or more neighboring blocks, one or more derived most probable modes (MPM), one or more previous coded Intra mode, or a combination thereof, and wherein N is a positive integer. Template matching Intra prediction is applied to the N template matching candidates to select one Intra mode with a lowest cost as a final Intra mode. The current block is encoded or decoded using Intra prediction with a current Intra mode selected from an Intra mode group comprising the final Intra mode derived.

According to yet another method, the quad-tree plus binary tree (QTBT) structure is used to partition an image or one or more areas of the current image into blocks. If the template-based Intra prediction is used for a current block and the current block is non-square, the width and height of the L-shaped reference pixel line are determined according to width and height of the current block. The L-shaped reference pixel line comprises a top reference pixel segment above the top template and a left reference pixel segment adjacent to a left side of the left template.

BRIEF DESCRIPTION OF THE DRAWINGS

FIG. 14 illustrates an example of un-even mode distribution in the height with finer prediction in the horizontal direction (i.e., mode 10), mode 2 (i.e., diagonal direction) and mode 18 (i.e., diagonal direction), where the block size is M×N with M equal to (2*N).

DETAILED DESCRIPTION OF THE INVENTION

Figure 1:
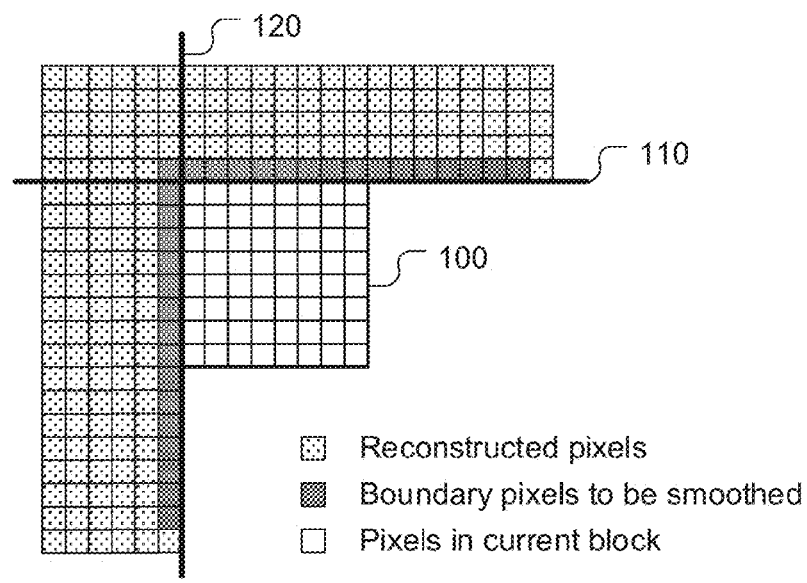
FIG. 1 illustrates the samples involved in Intra smoothing applied to a transform unit (TU) according to High Efficiency Video Coding (HEVC).

The following description is of the best-contemplated mode of carrying out the invention. This description is made for the purpose of illustrating the general principles of the invention and should not be taken in a limiting sense. The scope of the invention is best determined by reference to the appended claims.

In the following methods, a template, i.e., a set of reconstructed pixels from neighboring pixels of the current block is defined. For each of the pixels in this template, reference pixels from the neighboring pixels of the template are used to generate the corresponding predicted pixels using one of the available Intra prediction modes (either angular or non-angular). A cost function is defined to compare the distortion between the reconstructed pixels in the template and the predicted pixels in the template for a given Intra prediction mode. The template matching search is referred as evaluating the cost function among different Intra prediction modes within a template matching candidate set.

A. Intra Prediction Using Template Matching

In a first variation of this method, an integer number N is set such that the first N Intra prediction modes with lowest costs during the template matching search are selected. The final Intra prediction mode for the current block will be selected from these N modes using explicit signaling. In particular, if N can be expressed by $2^M$ (M is another integer number), then the signaling of Intra prediction mode can be done by using M bins. Note that N should be smaller or equal to the number of total available Intra prediction modes.

In a second variation, the Intra prediction mode (referred as target mode K) with lowest cost during the template matching search is selected. An integer number N is set such that the final Intra prediction mode for the current block will be selected from these N modes, using explicit signaling. In particular, if N can be expressed by $2^M$ (M is another integer number), then the signaling of Intra prediction mode can be done by using M bins. Note that N should be smaller or equal to the number of total available Intra prediction modes. The followings are rules to build these N modes.

If the target mode (e.g. mode K) is an angular mode, non-angular based modes such as DC and planar modes are also selected. If the sum of these modes does not add up to N, other angular modes that are close to this mode are also selected. For example, modes K+1, K+2 ... K−1, K−2, etc. are its neighboring modes. If any of the modes is not an available Intra prediction mode, this mode will be replaced by extending the original mode towards reverse direction (i.e., direction of the original mode plus 180 degree). For example, in FIG. 11, mode (K+2) is replaced by mode (K+2)', which corresponds to mode (K+2) rotated by 180 degrees. This operation is referred here as extended expression of Intra prediction mode. The ordering in the N-candidate mode list can vary. For example, the order can be: mode K, mode K+1, mode K−1, DC, planar, mode K+2, mode K−2, etc.

If the target mode (mode K) is a non-angular based mode, other non-angular mode(s) may also be selected. In addition to that, some typically used angular modes, such as vertical, horizontal, diagonal (i.e., 45 and 135 degrees) modes, as well as their neighboring modes (using similar extended expression above), are also selected. The ordering in the N-candidate mode list can vary.

In a third variation, an integer number N is set such that the first N Intra prediction modes with lowest costs during the template matching search are selected. These N modes are used as part of the MPM set during the Intra prediction mode coding. Redundant modes derived by the MPM list construction will be removed so that each of the modes in MPM is unique.

In a fourth variation, all angular modes are classified into several regions. An index is used to signal the region of the angular modes, where the template matching search will be performed. For the given region, template matching search is performed over all angular modes in this region. The best mode with lowest cost is selected to be the final Intra prediction mode. In one embodiment, the same coefficient scanning order (i.e. vertical, horizontal, diagonal scans, zig-zag, etc.) applies to all angular modes in the same region. Therefore, there is no dependency between the scan order and the result from template matching search.

In all the above variations, the integer number N can be a fixed number, or set at high level syntax, such as in sequence level (SPS), picture level (PPS) or slice level (slice header) or regional based (such as per CTU, or CTU row).

B: Number of Intra Prediction Modes Search by Template Matching

When the template matching is enabled for video data partitioned using the QTBT structures, different number of Intra modes can be used (i.e., searched) according to one method of the present invention. The method disclosed below also applies to video data partitioned using other coding unit (CU) structures. The Intra modes may be based on those disclosed in JVET-C0061.

In a first variation, it is proposed to use the same initial Intra modes, Num (i.e. 19, 35 (HEVC), 67 (JEM), 131 (JVET-C0061)) for all the template matching Intra coded blocks.

In a second variation, the number of Intra prediction modes used is dependent on the size of current block. In general, larger blocks will have more Intra prediction modes to search. In the following examples, some variables size1, size2, size3 and size4, where size1<size2 <size3<size4, are defined.

In one embodiment, the block size is measured by the width of the block. In other words, the width of the block is used as the block size. For example, when the current block width is greater than or equal to size1 and smaller than size2, Num1 (i.e., 35) initial modes are searched by the palette matching Intra prediction for the current block. When the current block width is greater than and equal to size2 and smaller than size3, Num2 (i.e., 67) initial modes are searched by for the current block. When the current block width is greater than and equal to size3, and smaller than size4, Num3 (i.e., 131) initial modes are searched by for the current block.

In a second embodiment, the block size is measured by the height of the block. In other words, the height of the block is used as the block size. When the current block height is greater than or equal to size1 and smaller than size2, Num1 (i.e., 35) initial modes are searched by the palette matching Intra prediction for the current block. When the current block height is greater than and equal to size2 and smaller than size3, Num2 (i.e., 67) initial modes are searched by the palette matching Intra prediction for the current block. When the current block height is greater than and equal to size3 and smaller than size4, Num3 (i.e., 131) initial modes are searched by the palette matching Intra prediction for the current block.

In a third embodiment, the block size is measured by the number of pixels in the block.

In a fourth embodiment, the block size is measured by the (width+height) of the current block. For example, when (width+height) of the current block is greater than or equal to size1 and smaller than size2, Num1 (i.e., 35) initial modes are searched by the palette matching Intra prediction for the current block. When the (width+height) of the current block is greater than and equal to size2 and smaller than size3, Num2 (i.e., 67) initial modes are searched by the palette matching Intra prediction for the current block. When the (width+height) of the current block is greater than and equal to size3 and smaller than size4, Num3 (i.e., 131) initial modes are searched by the palette matching Intra prediction for the current block.

In a fifth embodiment, when the current block width is smaller than size1, Num1 (i.e., 35) initial modes are searched by the palette matching Intra prediction for the current block. When the current block width is greater than size1, Num2 (i.e., 67) initial modes are searched by the palette matching Intra prediction for the current block.

In a sixth embodiment, when the current block height is smaller than size1, Num1 (i.e., 35) initial modes are searched by the palette matching Intra prediction for the current block. When the current block height is greater than size1, Num2 (i.e., 67) initial modes are searched by the palette matching Intra prediction for the current block.

In a seventh embodiment, when the current block width+height is smaller than size 1, Num1 (i.e., 35) initial modes are searched by the palette matching Intra prediction for the current block. When the current block width+height is greater than size1, Num2 (i.e., 67) initial modes are searched by the palette matching Intra prediction for the current block.

F: Intra Prediction Mode Assignment for a Non-Square Block

Figure 2:
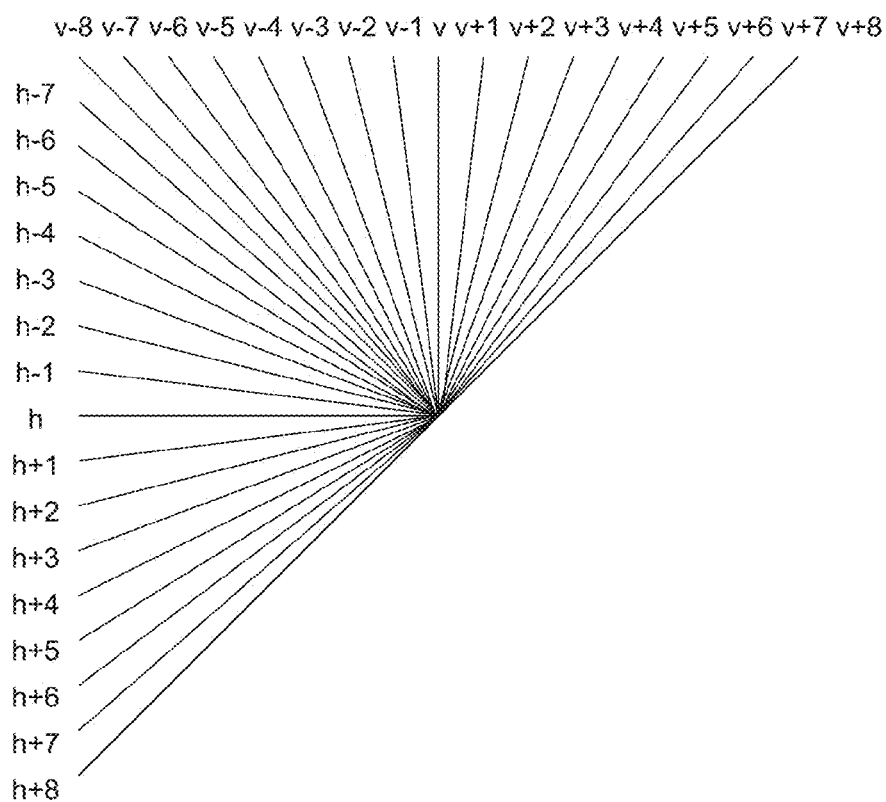
FIG. 2 illustrates the 33 directions for Intra prediction according to High Efficiency Video Coding (HEVC), where the directions are designated as H, H+1, . . . , H+8, H−1, . . . , H−7, V, V+1, . . . , V+8, V−1, . . . , V−8.

When the current block is a non-square block, the number of Intra angular modes can be different for the two sides of current block. In general, the longer side of a non-square block should have more Intra prediction directions (finer precision) than the shorter side. For example, the current block is an M×N block, where M=kN, M, N and k being integer numbers with M>N and k>1. Num_M represents the number of directions in side M and Num_N represents the number of directions in side N. The relation between Num_M and Num_N according to a method of the present invention is formulated as Num_M=Num_N*f(M, N), where f(M, N) is a function of M and N with values greater than 1 if M>N. Similar relation between Num_M and Num_N can be derived for the N>M case. For an M×N block, M indicates the width and N indicates the height. The number of directions in side M refers to the Intra modes in the vertical direction or closer to the vertical direction. For example, Intra modes (v−8) to (v+8) in FIG. 2 are referred as "Intra mode directions in side M". Similarly, Intra modes (h+8) to (h−7) are referred as "Intra mode directions in side N".

In one variation, a fixed ratio for f(M, N) is decided. In one embodiment, when M>N, f(M, N)=3, which means two times more modes are assigned to the longer side. In another embodiment, when M>N, f(M, N)=2, which means one time more modes are assigned to the longer side.

In another variation, the angular difference between two adjacent modes (i.e., the angular precision) on both side M and N keeps the same. In this case, if M=kN, then Num_M=Num_N*k.

Figure 12A:
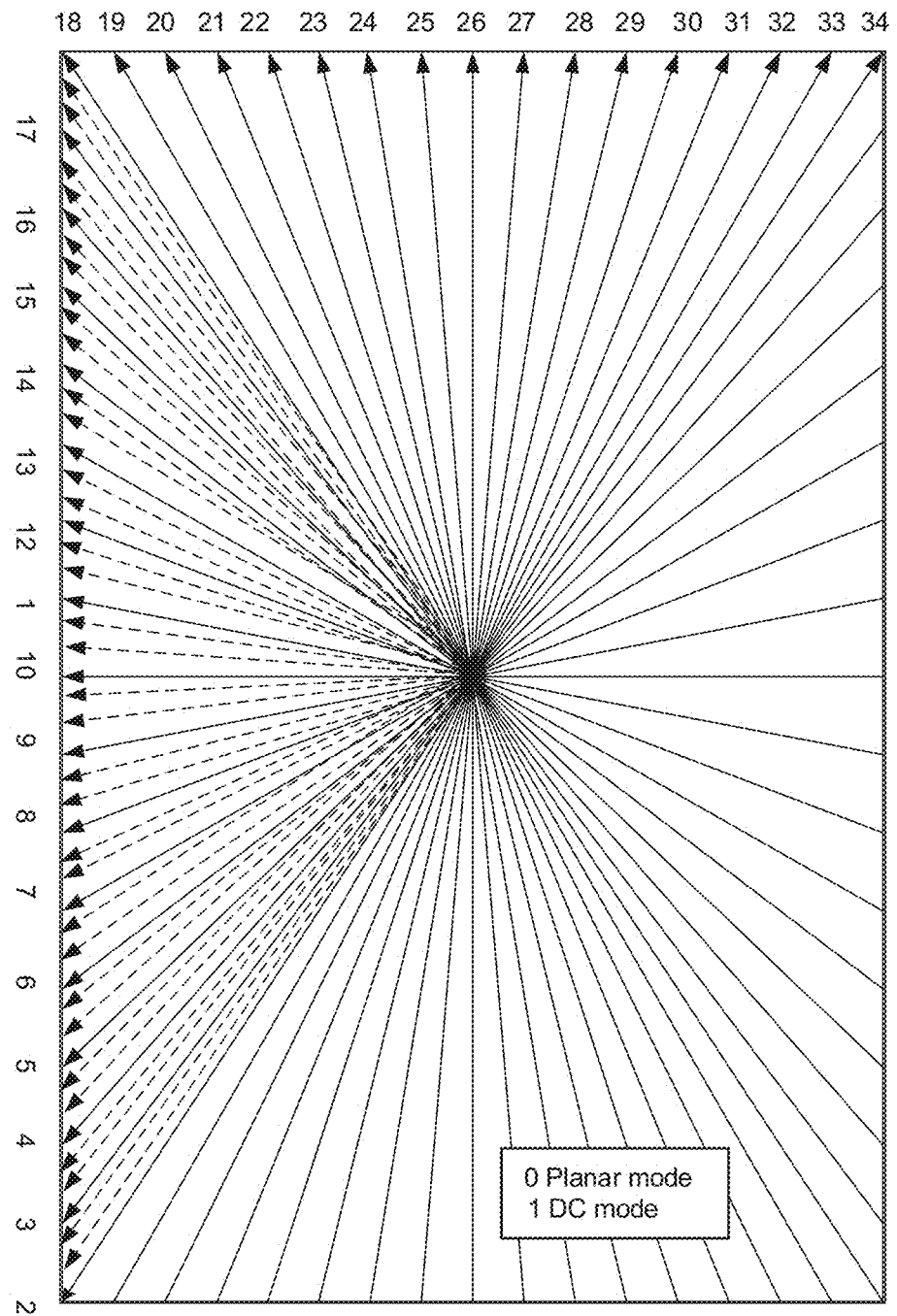
FIG. 12A illustrates an example of more modes (as compared to JEM) for the height when the width is smaller than the height of the block according to an embodiment of the present invention.
Figure 12B:
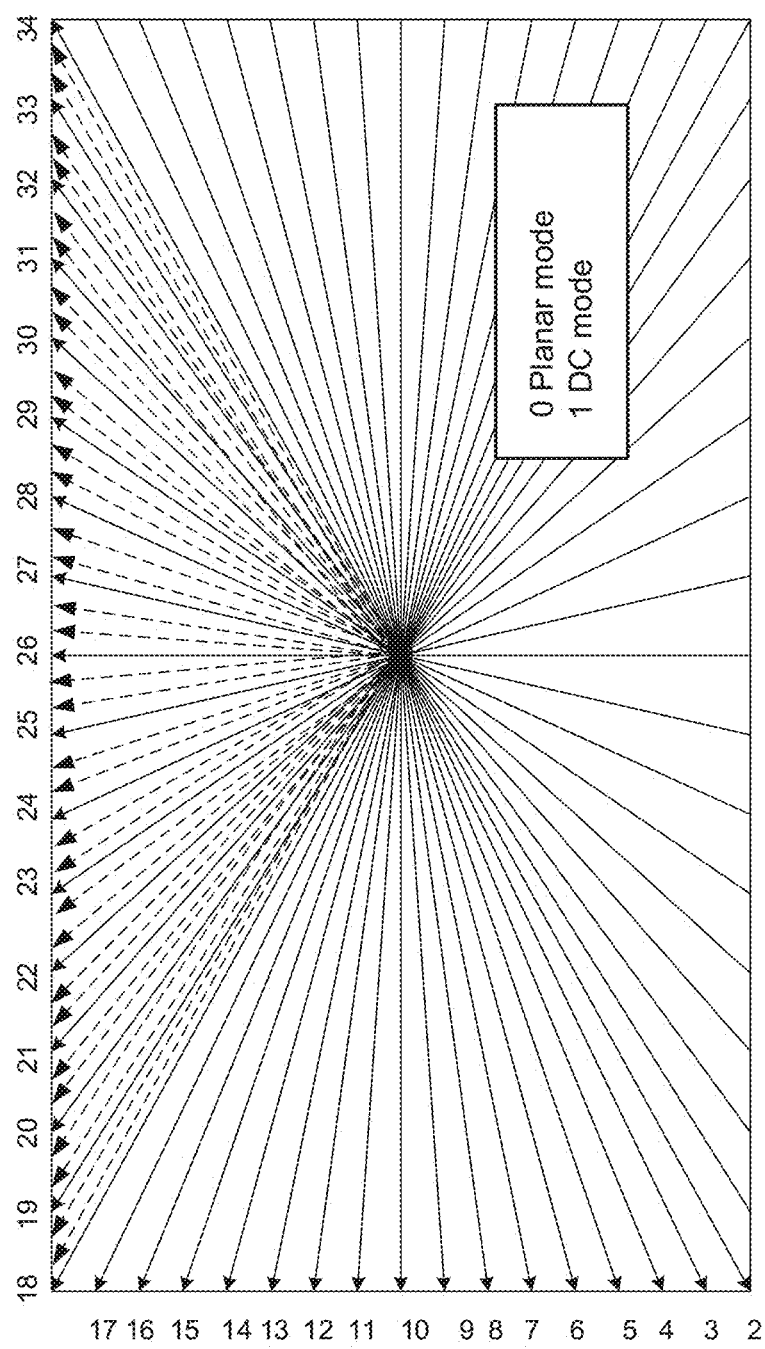
FIG. 12B illustrates an example of more modes for the width (as compared to JEM) when the height is smaller than the width of the block according to an embodiment of the present invention.

The followings are a few examples to describe the above mentioned methods in more details. In one embodiment, the total number of Intra modes for the non-square block will be the same to the square block. However, it is proposed to have more modes for the width, and less modes for the height when width>height (as compared to JEM). It is proposed to have more modes for the height, and less mode for the width when width<height (as compared to JEM). FIG. 12A and FIG. 12B illustrate the two examples, when height>width and width>height, respectively. The total number of Intra modes is 67 (65 angular modes) in both examples. Two times more modes are assigned to the longer side in both examples.

Figure 13A:
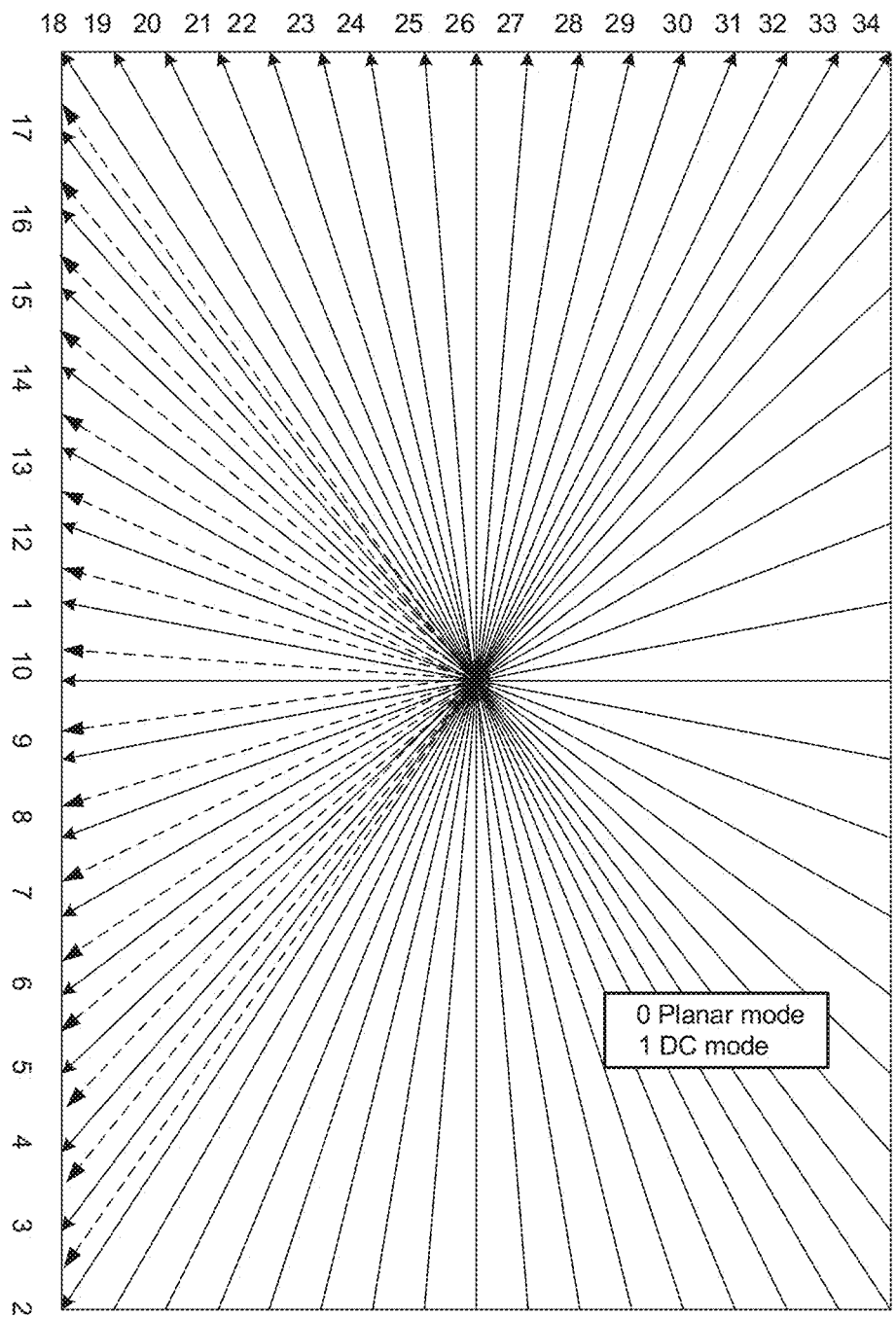
FIG. 13A illustrates an example of more modes for the height when the width is smaller than the height of the block according to an embodiment of the present invention, where the number of Intra modes for the height is twice as many as the Intra modes for the width.
Figure 13B:
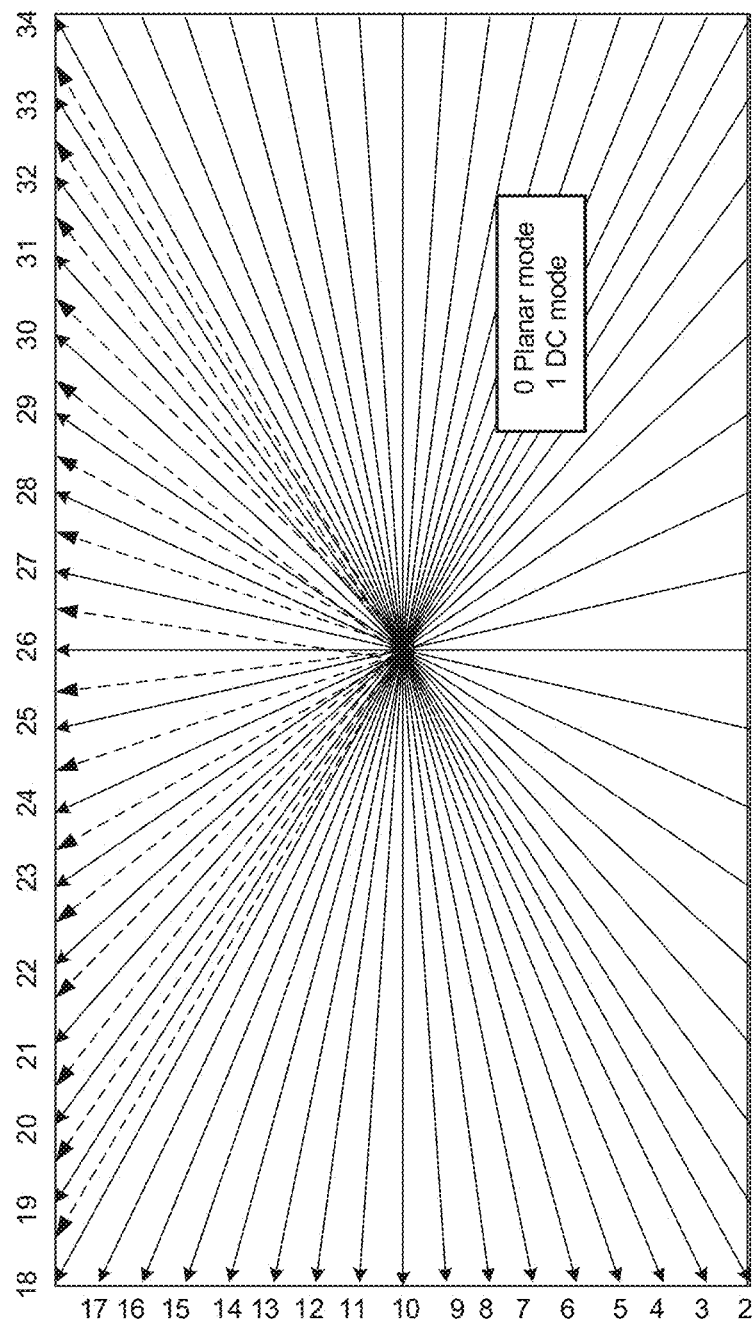
FIG. 13B illustrates an example of more modes for the width when the height is smaller than the width of the block according to an embodiment of the present invention, where the number of Intra modes for the width is twice as many as the Intra modes for the height.

In another embodiment, the total number of Intra modes for the non-square block can be different from the square block. It is proposed to have less modes for the height, and the same number of modes for the width when width>height (as compared to JEM). It is proposed to have less modes for the width, and the same number of modes for the width when width<height (as compared to JEM). FIG. 13A and FIG. 13B illustrate the two examples when height>width and width>height, respectively. The total number of Intra modes is 50 (48 angular modes) in both examples. One time more modes are assigned to the longer side in both examples.

In yet another embodiment, the total number of Intra modes for the non-square block can be different from the square block. The angular differences between two adjacent angular modes are the same on both sides. FIG. 13A and FIG. 13B illustrate the two examples when height=2*width and width=2*height, separately. The total number of Intra modes is 50 in both examples. One time more modes are assigned to the longer side in both examples.

In yet another embodiment, the mode distribution in each side can be un-even. Some angular is finer than others. In one embodiment, the prediction direction near horizontal direction (i.e., mode 10), mode 2 (i.e., diagonal direction) and mode 18 (i.e., diagonal direction) can have finer prediction. Other directions can be coarser. An example of an M×N block with M equal to (2*N) is illustrated in FIG. 14.

In FIG. 14, the modes near horizontal direction and diagonal directions have finer prediction. In another embodiment, the modes near the vertical direction, mode 34 (i.e., diagonal direction) can be finer precision. In the case of total number of modes is equal to 67, the diagonal mode 34 becomes mode 66.

In another method, there can be Num1 modes for the shorter side and Num2 modes for the longer sides, where Num1<Num2. (Num1 +Num2) should be smaller than the total number of modes.

Figure 15A:
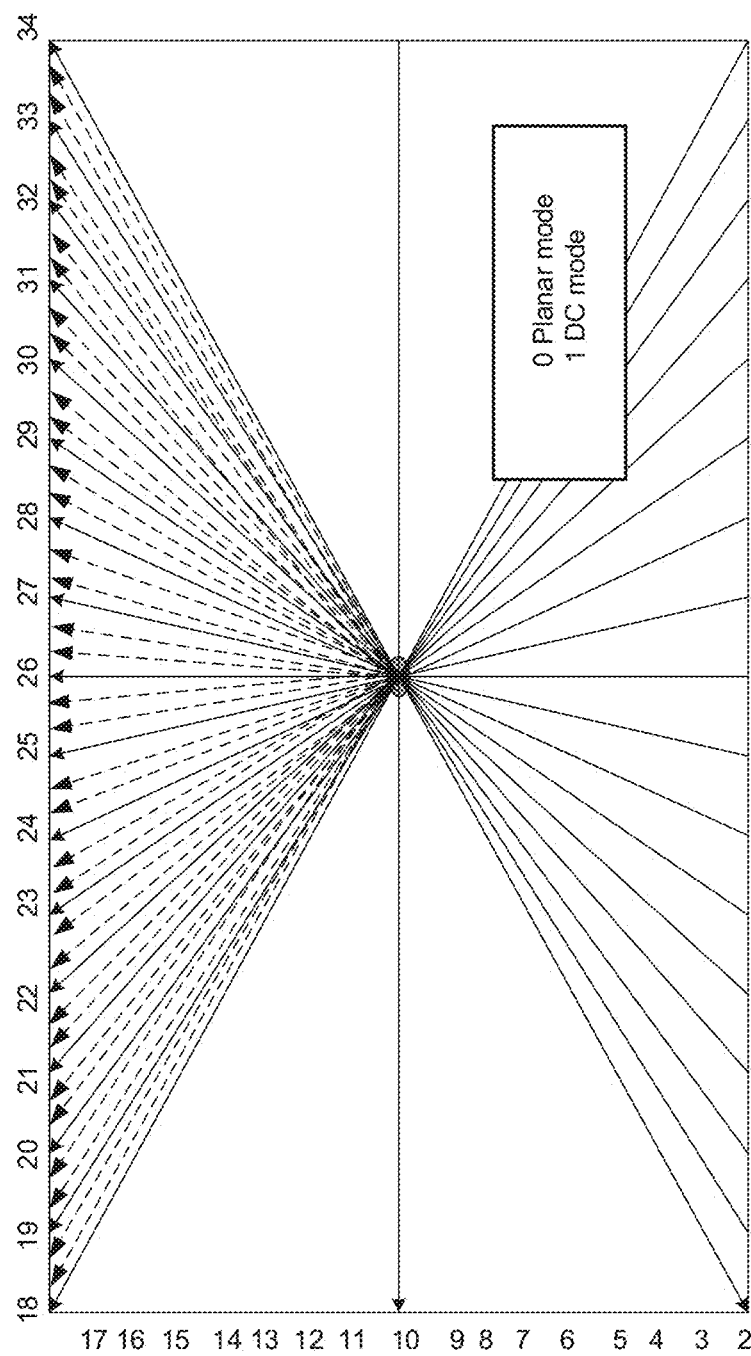
FIG. 15A illustrates an example of even mode distribution in the width, where 2 Intra modes in the height side and (i.e., the shorter side) 33 Intra modes in the width side (i.e., the longer side).
Figure 15B:
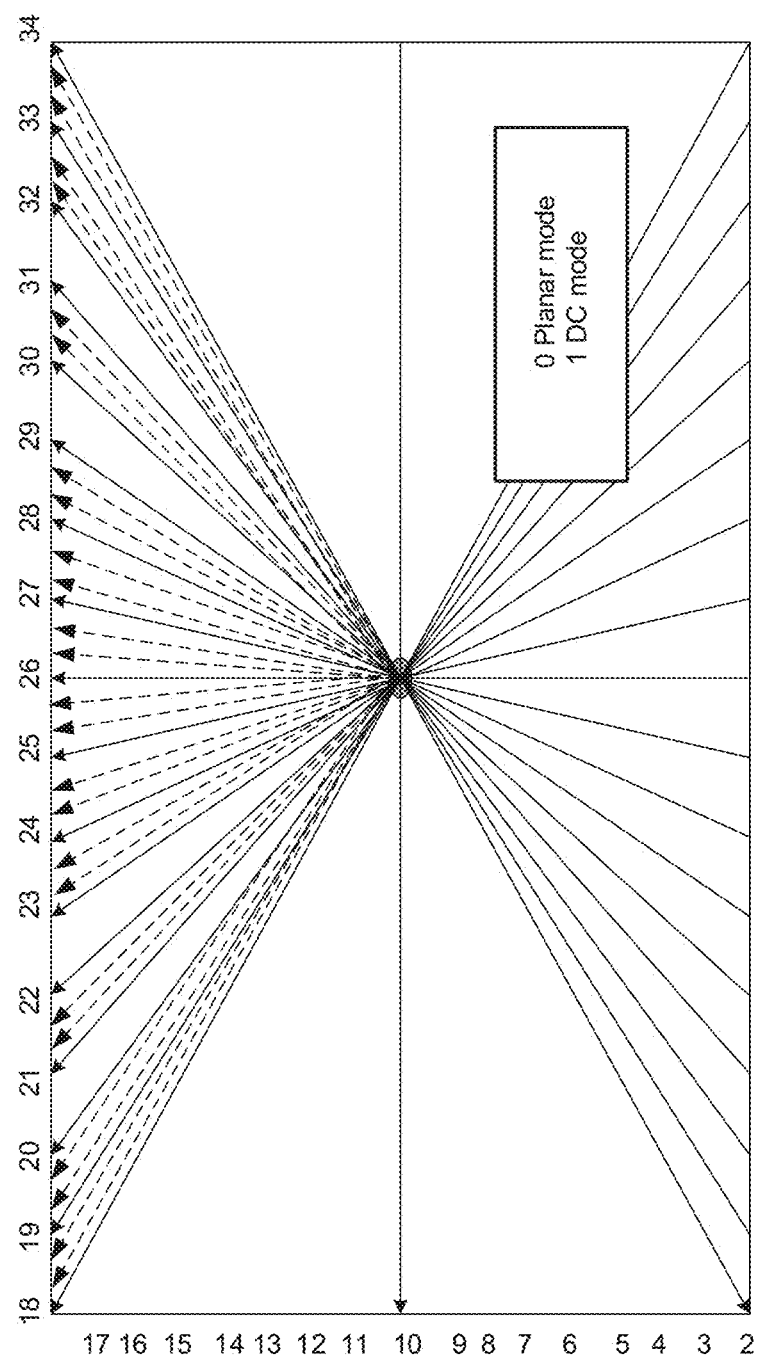
FIG. 15B illustrates an example of even mode distribution in the width, where 2 Intra modes in the height side and (i.e., the shorter side) 25 Intra modes in the width side (i.e., the longer side).

In one embodiment, the distribution of modes can be even. An example for the case with Num1 equal to 2 and Num2 equal to 33 is illustrated in FIG. 15A. In another embodiment, the distribution of modes can be un-even. An example of Num1 equal to 2 and Num2 equal to 25 is illustrated in FIG. 15B.

I: Intra Prediction Mode Derivation Using Template Matching

In a first variation of this method, an integer number N is set such that the first N Intra prediction modes with lowest cost during the template matching search are selected. The final Intra prediction mode for the current block will be selected from these N modes, using explicit signaling. In particular, a variable length coding is applied to these N modes. For a mode in these N modes with a lower cost, a shorter codeword is assigned. Note that N should be smaller or equal to the number of total available Intra prediction modes.

In a second variation, the approach (either approach A, approach B or both) to be used from template matching search result is the same for all block sizes. However, a constraint of the minimum block size that can use template matching search is specified.

In one embodiment, Intra prediction mode derivation only depends on the shorter side of the block. For example, template matching search (either approach A or B) is enabled only when the smaller one of width and height of the block is greater than or equal to minimum block size, MIN_BLOCK_SIZE, which can be signaled at SPS, PPS or slice level, or region based (such as per CTU). MIN_BLOCK_SIZE can also be assumed by both encoder and decoder so that no explicit signaling is needed. MIN_BLOCK_SIZE can also be signaled in log-base-2 fashion using LOG2_MIN_BLOCK_SIZE. Therefore, the template matching is enabled when the width and height of a block is greater or equal to minimum block size (i.e., 2^LOG2_MIN_BLOCK_SIZE).

In another embodiment, Intra prediction mode derivation only depends on the perimeter of the block. For example, the sum of the width and height of a block is used to represent its perimeter. In other expressions, (width+height)/2 may also be used. Template matching search (either approach A or B) is enabled only when the (width+height) of the block is greater than or equal to MIN_BLOCK_SIZE. MIN_BLOCK_SIZE can be signaled at SPS, PPS or slice level, or region based (such as per CTU). MIN_BLOCK_SIZE can be assumed by both encoder and decoder. MIN_BLOCK_SIZE can also be signaled in log-base-2 fashion using LOG2_MIN_BLOCK_SIZE, Therefore, the template matching is enabled when the (width+height) of a block is greater than or equal to minimum block size (i.e., 2^LOG2_MIN_BLOCK_SIZE).

In a third embodiment, Intra prediction mode derivation only depends on the area of the block. The (width*height) of a block need to meet the minimum requirement. For example, template matching search is enabled only when the (width*height) of the block is greater than or equal to MIN_BLOCK_AREA. MIN_BLOCK_AREA can be signaled at SPS, PPS or slice level, or region based (such as per CTU). MIN_BLOCK_AREA can be assumed by both encoder and decoder. MIN_BLOCK_AREA can also be signaled in log-base-2 fashion using LOG2_MIN_BLOCK_AREA. Therefore, the template matching is enabled when (width*height) is greater than or equal to (2^LOG2_MIN_BLOCK_AREA). In other words, when (Log2(width)+Log2(height)) is greater than or equal to minimum block area (i.e., LOG2_MIN_BLOCK_AREA), the template matching is enabled.

In all the above embodiments, the number of Intra prediction modes checked in template matching search is the same for all block sizes.

In a third variation, whether to use approach A or use approach B is determined by the block size of current prediction block.

In one embodiment, the block size is measured by the area of the block, i.e., (width*height) of the current block. When (width*height) of the current block is greater than or equal to BLOCK_AREA_0, approach A is applied. When (width*height) of the current block is smaller than BLOCK_AREA_1, approach B is applied. When width*height of the current block is smaller than BLOCK_AREA_2, neither approach A nor approach B is applied.

In another embodiment, the use of Approach A and Approach B is similar to the embodiment above. However, the selection of Approach A and Approach B. When (width*height) of the current block is greater than or equal to BLOCK_AREA_0, approach B is applied. When (width*height) of the current block is smaller than BLOCK_AREA_1, Approach A is applied. When width*height of the current block is smaller than BLOCK_AREA_2, neither approach A nor approach B is applied.

In a third embodiment, the block size corresponds to the shorter side of the block. When the smaller of width or height of the current block is greater than or equal to BLOCK_SIZE_0, Approach A is applied. When the smaller of width or height of the current block is smaller than BLOCK_SIZE_1, Approach B is applied. When the smaller of width or height of the current block is smaller than BLOCK_SIZE_2, neither Approach A nor Approach B applies.

In a fourth embodiment, the block size corresponds to the shorter side of the block. When the smaller of width or height of the current block is greater than or equal to BLOCK_SIZE_0, Approach B is applied. When the smaller of width or height of the current block is smaller than BLOCK_SIZE_1, Approach A is applied. When the smaller of width or height of the current block is smaller than BLOCK_SIZE_2, neither Approach A nor Approach B applies.

In a fifth embodiment, the block size corresponds to the perimeter of the block. The perimeter can be measured as (width+height) of the block, 2*(width+height), or (width+height)/2. In the following, (width+height) is used as an example of Intra mode derivation for template match. When the (width+height) of the current block is greater than or equal to BLOCK_SIZE_0, Approach A is applied. When the (width+height) of the current block is smaller than BLOCK_SIZE_1, Approach B is applied. When the (width+height) of the current block is smaller than BLOCK_SIZE_2, neither Approach A nor Approach B applies.

In a sixth embodiment, the block size corresponds to the perimeter of the block. The perimeter can be measured as (width+height) of the block, 2*(width+height), or (width+height)/2. In the following, (width+height) is used as an example of Intra mode derivation for template match. When the (width+height) of the current block is greater than or equal to BLOCK_SIZE_0, Approach B is applied. When the (width+height) of the current block is smaller than BLOCK_SIZE_1, Approach A is applied. When the (width+height) of the current block is smaller than BLOCK_SIZE_2, neither Approach A nor Approach B applies.

In all the above embodiments, BLOCK_AREA_0, BLOCK_AREA_1 and BLOCK_AREA_2, BLOCK_SIZE_0, BLOCK_SIZE_1, BLOCK_SIZE_2, can be signaled at SPS, PPS or slice level, or region based (such as per CTU). These parameters can be assumed by both encoder and decoder. They can also be in log-base-2 fashion, similar as in previous methods.

In all the above embodiments, the number of Intra prediction modes checked in template matching search is the same for all block sizes.

In all the above embodiments, in some special cases (e.g. certain BLOCK_AREA_X or BLOCK_SIZE_X values being set, X=0, 1, or 2), only one approach from either Approach A or Approach B in the above applies to all block sizes, with a minimum block size requirement to enable the template matching search.

In a fourth variation, approach A in all the above mentioned methods can be generalized as the one in the method disclosed in section I, where instead of using the best mode from template matching search directly, the final Intra prediction mode is signaled from the first N Intra prediction modes with lowest cost during the template matching search are selected.

In a fifth variation, approach B in all the above mentioned methods can be generalized such that instead of putting the best mode from template matching search into the MPM set, the best M modes from template matching search are put into the MPM set for the current block. Here M is an integer number smaller than or equal to the number of available modes for template matching search.

In a sixth variation, approach B in all the above mentioned methods can be generalized such that in addition to the best mode from template matching search (referred as a target mode, K), some neighboring modes close to mode K are also put into the MPM set for the current block. In one embodiment, if mode K is an angular mode, mode K+1, mode K−1, mode K+2, mode K−2 . . . mode K+M, mode K−M are also put into the MPM set, where M is a positive integer number. All the additional modes here are from a set of predefined Intra prediction directions used in template matching search. In one embodiment, when there are 127 directions used in template matching search, all modes are from these 127 directions. In another embodiment, when mode K+M or mode K−M is smaller than 45 degree, a mode corresponding to adding 180 degrees to the mode angle is used. When mode K+M or mode K−M is greater than 225 degree, a mode corresponding to subtracting 180 degrees from the mode angle is used.

J: Reference Pixels for DIMD with QTBT Structure.

When apply DIMD to QTBT, the above and left reference pixel length should be modified according to one method of the present invention.

In a first variation of the method, when the above reference and left reference are both available, the lengths of the reference are calculated as below:

Width_reference=Width_$b$+Height_$b$+template size+1, and

Height_reference=Height_$b$+Width_$b$+template size+1.

Figure 16:
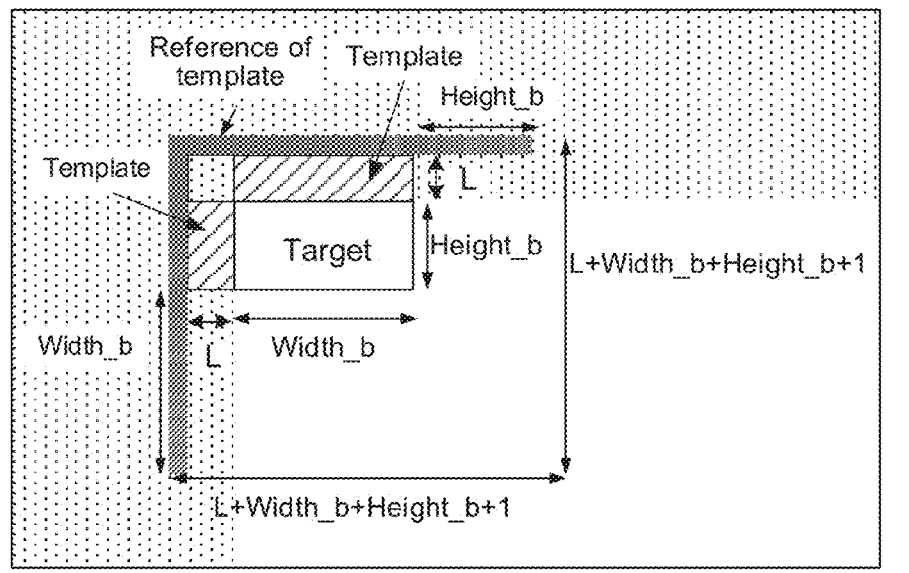
FIG. 16 illustrates an example of reference pixels used by the template, where the reference pixels above the top template are extended by Height_b pixels and the reference pixels to the left of the left template are extended by Width_b pixels.

In the above equations, the Width_reference denotes the width of above reference, Height_reference denotes the height of the left reference of the template, Width_b and Height_b denote the width and height of the current block, and template size corresponds to L. FIG. 16 illustrates an example of reference pixels involved.

In a second variation, when the above reference and left reference are both available the lengths of the reference are calculated as below:

Width_reference=Width_$b$+Height_$b$+template size*2+1, and

Height_reference=Height_$b$+Width_$b$+template size*2+1.

Figure 17:
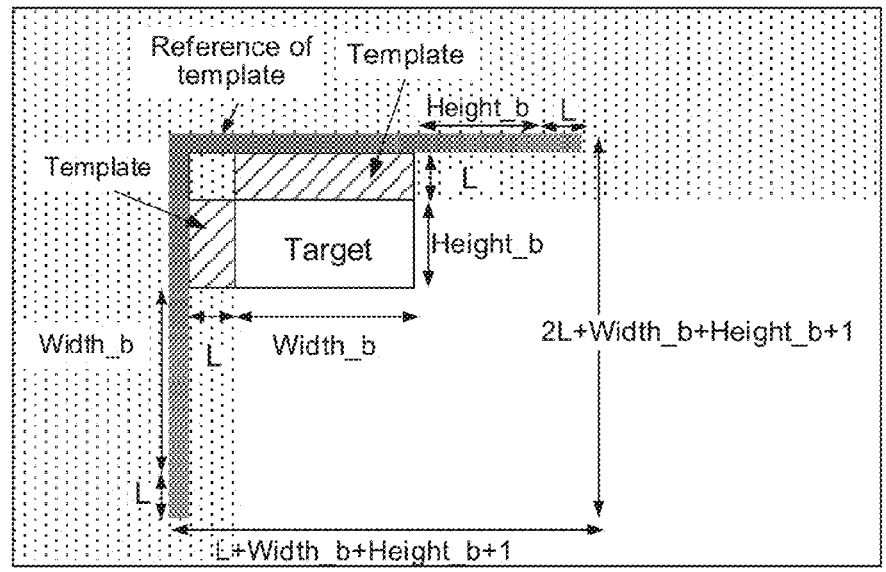
FIG. 17 illustrates an example of reference pixels used by the template, where the reference pixels above the top template are extended by (Height_b+L) pixels and the reference pixels to the left of the left template are extended by (Width_b+L) pixels.

FIG. 17 illustrates an example of reference pixels involved.

In a third variation, when the above reference and left reference are both available, the lengths of the reference are calculated as below:

Width_reference=2*(Width_$b$+template size)+1, and

Height_reference=2*(Height_$b$+template size)+1

Figure 18:
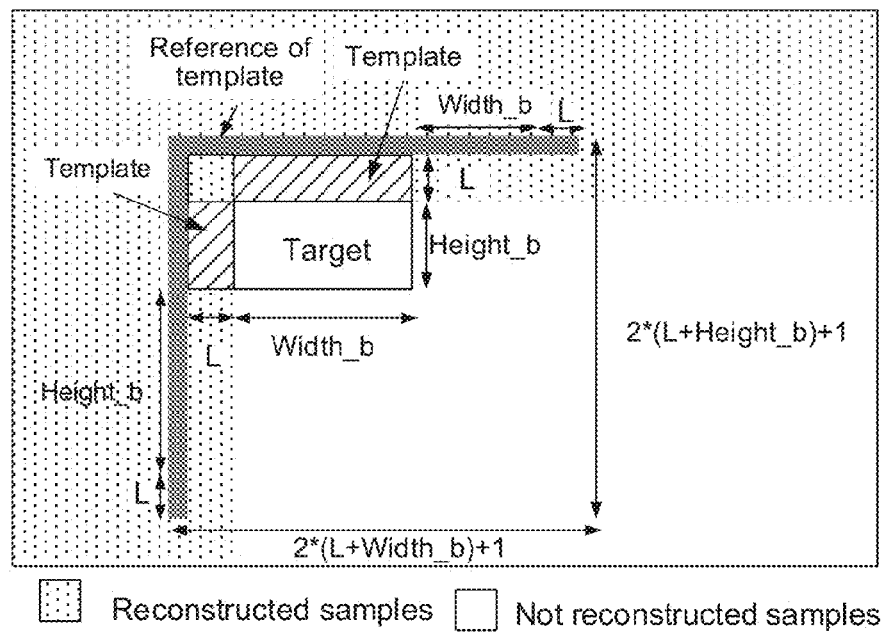
FIG. 18 illustrates an example of reference pixels used by the template, where the reference pixels above the top template are extended by Width_b pixels and the reference pixels to the left of the left template are extended by Height_b pixels.

FIG. 18 illustrates an example of reference pixels involved.

In a fourth variation, when the above reference and left reference are both available, the lengths of the reference are calculated as below:

Width_reference=2*(Width_$b$)+template size+1, and

Height_reference=2*(Height_$b$)+template size+1.

Figure 19:
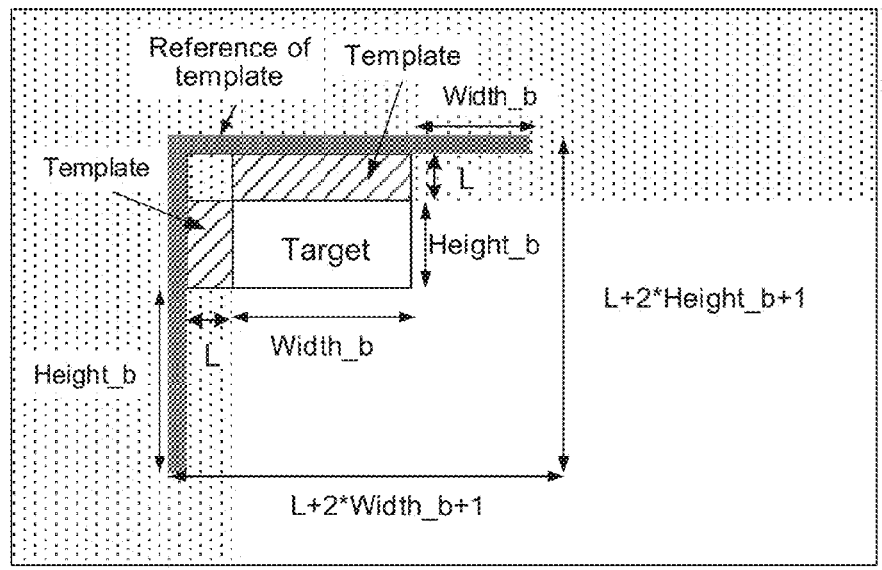
FIG. 19 illustrates an example of reference pixels used by the template, where the reference pixels above the top template are extended by (Width_b+L) pixels and the reference pixels to the left of the left template are extended by (Height_b+L) pixels.

FIG. 19 illustrates an example of reference pixels involved.

When only the above reference or only the left reference of the template is available, the lengths of the above and left reference are calculated according to one embodiment as below:

Width_reference=Width_$b$+Height_$b$+1, and

Height_reference=Width_$b$+Height_$b$+1.

The left samples or the above samples that are not available will be padded with some values.

K: Predictor Generation for DIMD with QTBT Structure.

To generate the DC predictor, planar predictor, and angular predictor, the template will use the similar method to Intra mode in JEM 2.0 with QTBT (i.e., COM16-C966).

L: Signaling of DIMD.

It is proposed to signal a DIMD_flag at each CU/PU/TU to indicate whether this mode is used or not. When the DIMD_flag is 0, it indicates that this mode is not used. When the DIMD_flag is 1, it indicates that this mode is used.

DIMD Mode Improvements

Some methods are disclosed herein to improve the efficiency or to reduce the complexity of DIMD search.

The block size and block width/height are considered to decide the number of modes in the DIMD search. In general, for a larger block, which is measured as block area, longer-side length or shorter-side length of the block, more angular modes are checked in DIMD search. For a smaller block, fewer angular modes are checked in DIMD search.

The following are methods to determine the block size:

The area of a block, calculated by width*height of this block, can be 16*N samples, where N=1, 2, etc.

The longer-side of the block, calculated by max(width, height) of this block, can be $2^N$ samples, where N=1, 2, etc.

The shorter side of the block, calculated by min(width, height) of this block, can be $2^N$ samples, where N=1, 2, etc.

Figure 3:
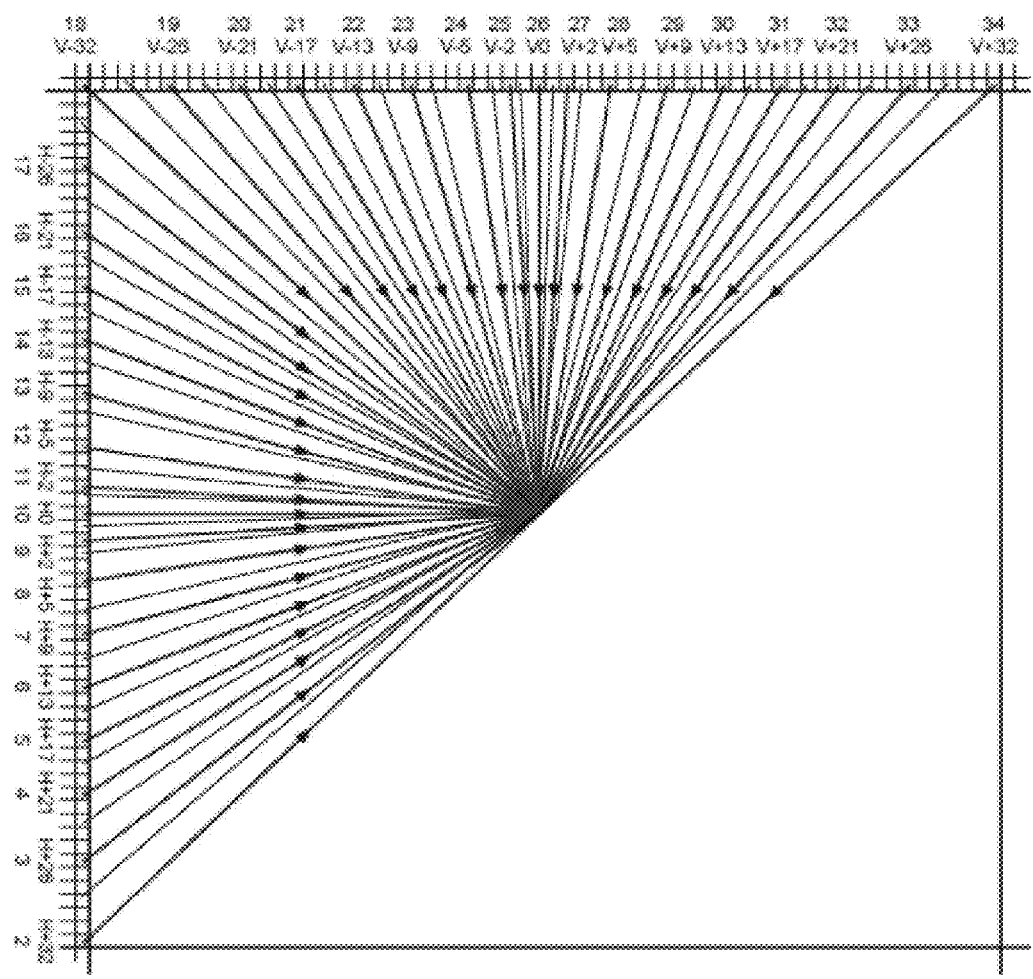
FIG. 3 illustrates an example of 65 directions for Intra prediction by adding 32 directional modes in between the existing 33 directional modes.
Figure 4A:
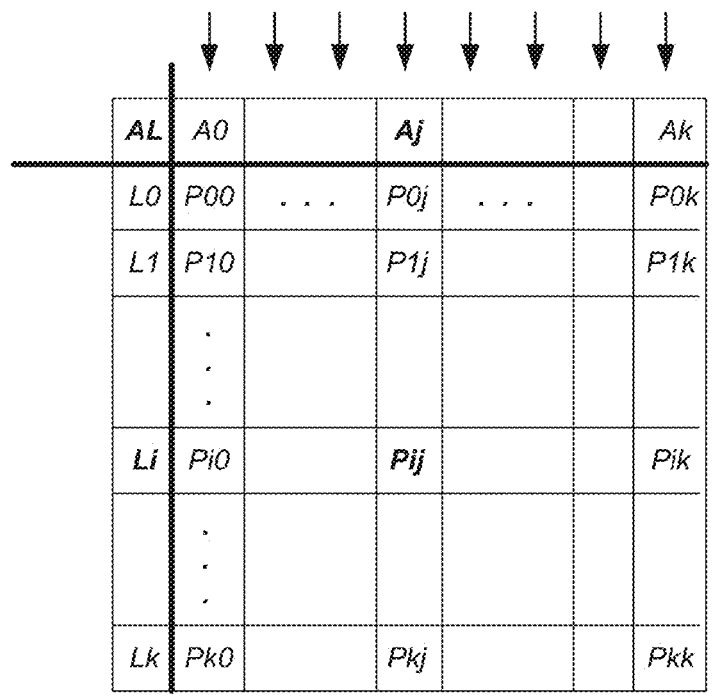
FIG. 4A illustrates an example for the vertical directional mode for Intra prediction.
Figure 4B:
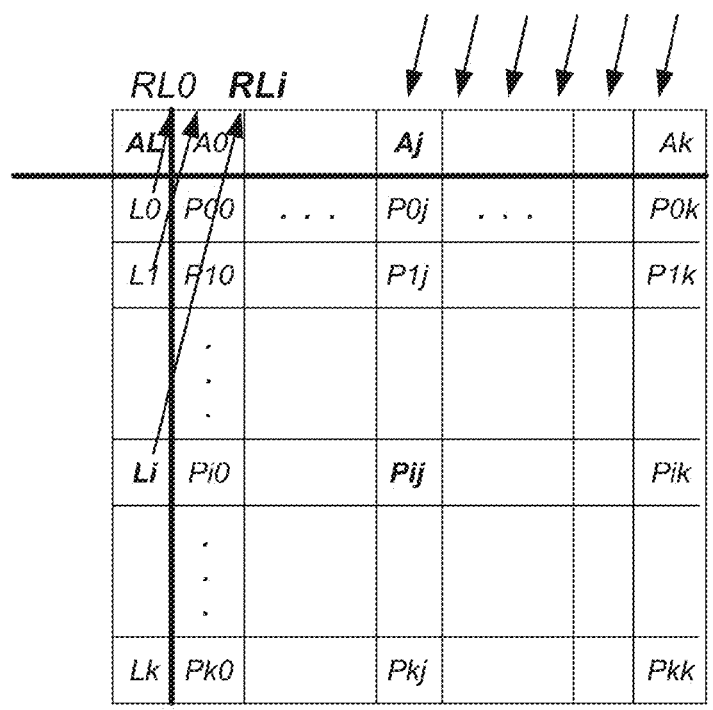
FIG. 4B illustrates an example Intra gradient filter for the Intra prediction modes from (v+1) to (v+8) according to High Efficiency Video Coding (HEVC).
Figure 5:
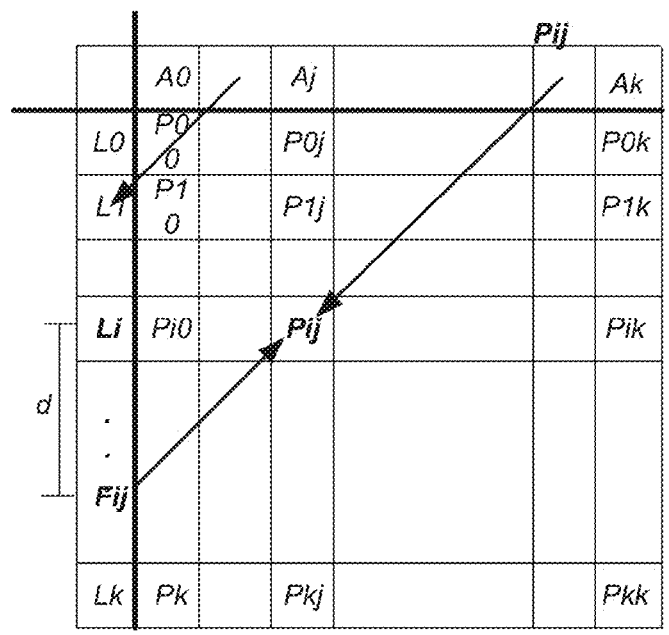
FIG. 5 illustrates an example bi-directional prediction filter for the Intra prediction modes from (v+1) to (v+8) according to High Efficiency Video Coding (HEVC).
Figure 6:
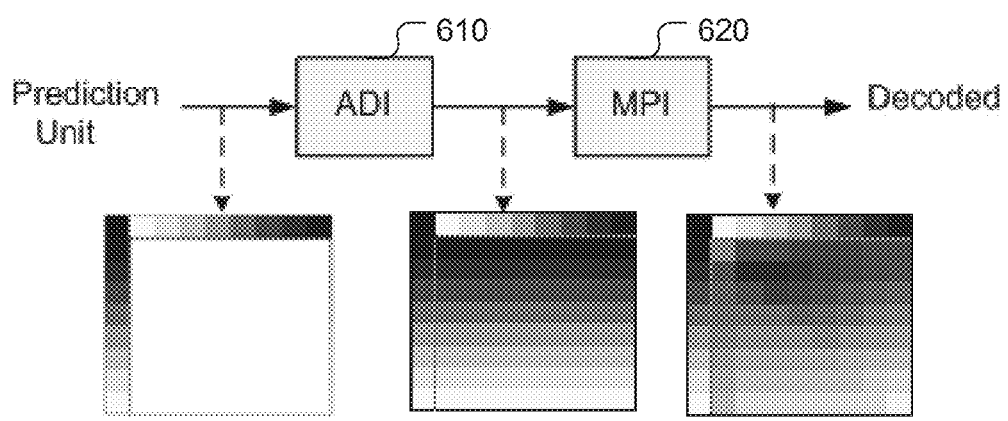
FIG. 6 illustrates an example of multiple parameter Intra prediction (MPI) process.
Figure 7:
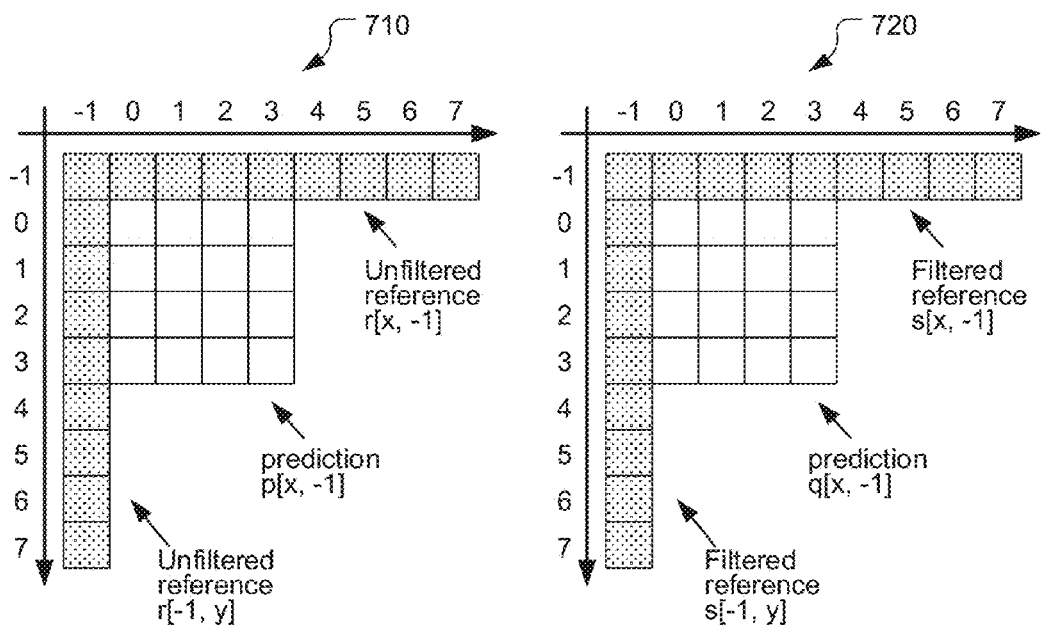
FIG. 7 illustrates an example of Intra prediction in 4×4 blocks for the unfiltered and filtered cases.
Figure 8:
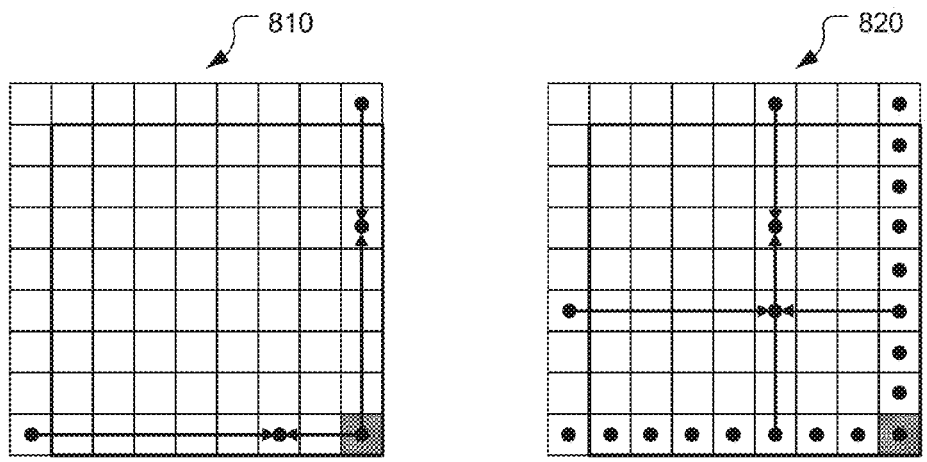
FIG. 8 illustrates an example of Bi-linear interpolation of right most column and bottom row (left) and Bi-linear interpolation of the rest samples (right).
Figure 9:
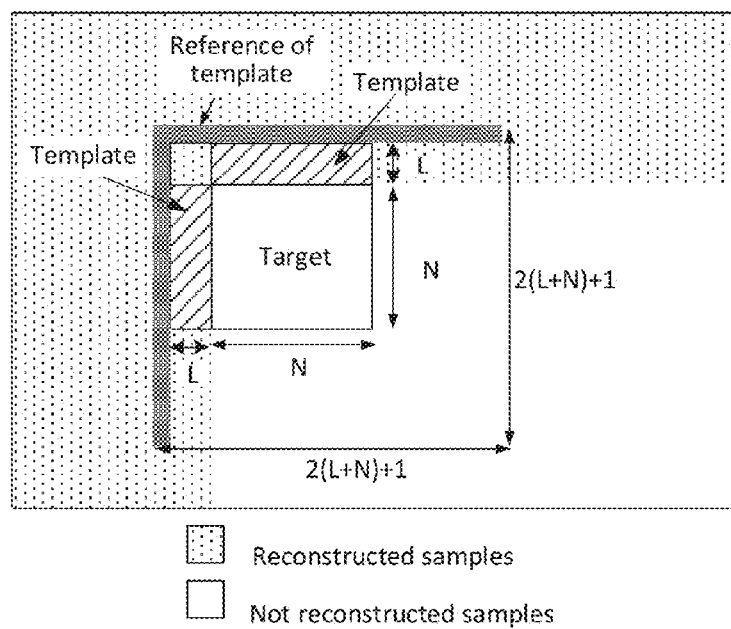
FIG. 9 illustrates an example of decoder side Intra mode derivation (DIMD), where the template correspond to pixels on the top of current block and to the left of current block.
Figure 10:
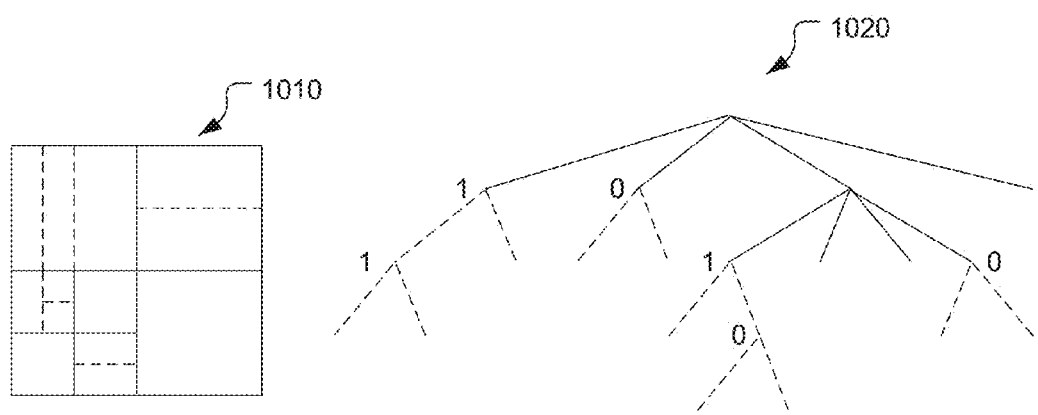
FIG. 10 illustrates an example of block partitioning by using QTBT, where the block partitioning is shown in the left and the corresponding QTBT structure is shown on the right.
Figure 20:
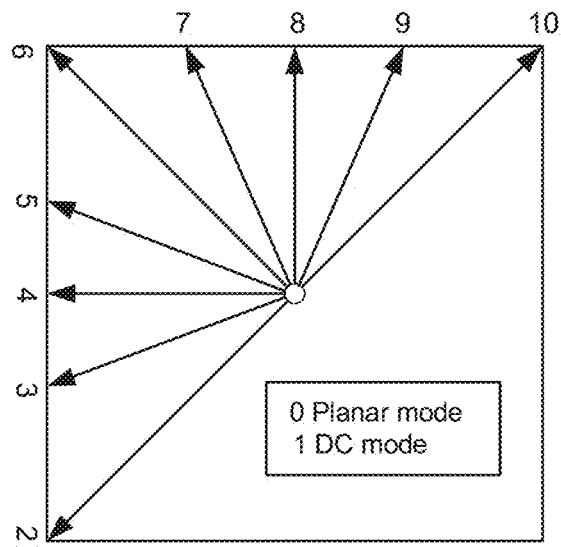
FIG. 20 illustrates an example of Intra modes for the first round of DIMD (Decoder Side Intra Mode Derivation).
Figure 21:
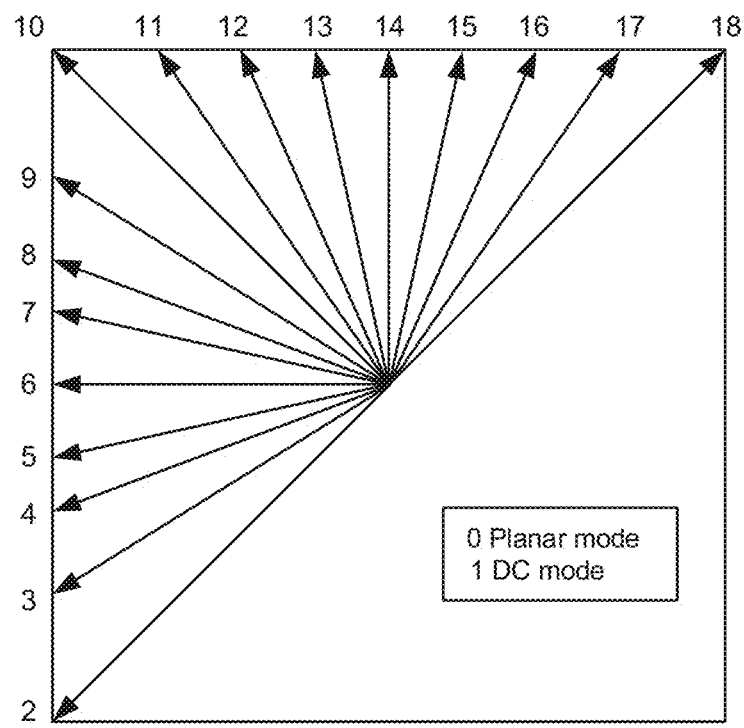
FIG. 21 illustrates an example of Intra modes with 17 angular Intra modes for DIMD (Decoder Side Intra Mode Derivation).

The following are candidate mode sets, ModeSetX, for performing DIMD search, where X is a variable):

ModeSet0: No angular mode
ModeSet9: 9 angular modes (e.g. FIG. 20)
ModeSet17: 17 angular modes (e.g. FIG. 21)
ModeSet33: 33 angular modes (e.g. FIG. 2)
ModeSet65: 65 angular modes (e.g. FIG. 3)
ModeSet129: 129 angular modes (e.g. adding one angular direction in between every two existing angular directions in the set of 65 modes)
ModeSet257: 257 angular modes (e.g. adding one angular direction in between every two existing angular directions in the set of 129 modes)
. . .

In one method, according to the block size of the current block, a proper set of modes is selected to perform DIMD search. The block size of the current block is determined by block area, maximum of block width and height, minimum of block width and height, etc.

In one embodiment, the following mode assignments are used:
Angular modes in ModeSet0 are used for DIMD if block area is less than or equal to Area_1;
Angular modes in ModeSet9 are used for DIMD if block area is greater than Area_1 and less than or equal to Area_2;
Angular modes in ModeSet17 are used for DIMD if block area is greater than Area_2 and less than or equal to Area_3;
Angular modes in ModeSet33 are used for DIMD if block area is greater than Area_3 and less than or equal to Area_4;
Angular modes in ModeSet65 are used for DIMD if block area is greater than Area_4 and less than or equal to Area_5;
Angular modes in ModeSet129 are used for DIMD if block area is greater than Area_5.

In the above list, Area_1, Area_2, Area_3, Area_4 and Area_5 may be equal to 16×N samples, where N is a positive integer number. In the above mode assignment structure, some typically used area parameters are listed as follows:

TABLE 1

| Area (samples) | Modes assignments | | | |
|---|---|---|---|---|
| <=16 | 9 | 0 | 0 | 9 |
| =32 | 17 | 9 | 9 | 17 (or 33) |
| =64 | 33 | 17 | 33 | 65 |
| =128 | 33 | 17 | 33 | 65 |
| >=256 | 65 | 65 | 65 | 65 |

A subset of the above combination can form a new set of Intra modes. Some examples are listed as follows.

Example 1. The following mode assignments are made:
Angular modes in ModeSet9 are used for DIMD if block area is less than or equal to Area_1;
Angular modes in ModeSet17 are used for DIMD if block area is greater than Area_1 and less than or equal to Area_2; and
Angular modes in ModeSet65 are used for DIMD if block area greater than Area_2.

Example 2. The following mode assignments are made:
Angular modes in ModeSet9 are used for DIMD if block area is less than or equal to Area_1; and
Angular modes in ModeSet65 are used for DIMD if block area greater than Area_1.

Example 3. The following mode assignments are made:
Angular modes in ModeSet9 are used for DIMD if block area is less than or equal to Area_1;
Angular modes in ModeSet33 are used for DIMD if block area is greater than Area_1 and less than or equal to Area_2; and
Angular modes in ModeSet65 are used for DIMD if block area is greater than Area_2.

Example 4. The following mode assignments are made:
Angular modes in ModeSet9 are used for DIMD if block area is less than or equal to Area_1;
Angular modes in ModeSet17 are used for DIMD if block area is greater than Area_1 and less than or equal to Area_2;
Angular modes in ModeSet33 are used for DIMD if block area is greater than Area_2 and less than or equal to Area_3; and
Angular modes in ModeSet65 are used for DIMD if block area is greater than Area_3.

In the above embodiments, the block area can be replaced by the length of the longer side (i.e., max (width, height)) or the shorter side (i.e., min (width, height)) of the current block.

The following are few examples. When the block size criteria is the length of the longer side of the block, the following mode assignments are made:
Angular modes in ModeSet0 are used for DIMD if block's longer side is less than or equal to Length_1;
Angular modes in ModeSet9 are used for DIMD if block's longer side is greater than Length_1 and less than or equal to Length_2;
Angular modes in ModeSet17 are used for DIMD if block's longer side is greater than Length_2 and less than or equal to Length_3;
Angular modes in ModeSet33 are used for DIMD if block's longer side is greater than Length_3 and less than or equal to Length_4;
Angular modes in ModeSet65 are used for DIMD if block's longer side is greater than Length_4 and less than or equal to Length_5; and
Angular modes in ModeSet129 are used for DIMD if block's longer side is greater than Length_5.

In the above examples, Length_1, Length_2, Length_3, Length_4 and Length_5 may be equal to 4×N samples, where N is a positive integer number.

In the above mode assignment structure, a few typically used area parameters are listed as follows:

TABLE 2

| Longer side length (samples) | Modes assignments | | | | | |
|---|---|---|---|---|---|---|
| <=4 | 9 | 0 | 9 | 9 | 9 | 9 |
| =8 | 17 | 9 | 17 | 33 | 9 | 65 |
| =16 | 33 | 33 | 65 | 65 | 65 | 65 |
| =32 | 65 | 65 | 65 | 65 | 65 | 65 |
| >=64 | 65 | 65 | 65 | 65 | 65 | 65 |

A subset of the above combination can form a new set of Intra modes. Some examples are provided as follows:

Example 1. The following mode assignments are made:

Angular mode in ModeSet9 is used for DIMD if block's longer side is less than or equal to Length_1;
Angular modes in ModeSet17 are used for DIMD if block's longer side is greater than Length_1 and less than or equal to Length_2; and
Angular modes in ModeSet65 are used for DIMD if block's longer side is greater than Length_2.

Example 2. The following mode assignments are made:
Angular mode in ModeSet9 is used for DIMD if block's longer side is less than or equal to Length_1;
Angular modes in ModeSet17 are used for DIMD if block's longer side is greater than Length_1 and less than or equal to Length_2;
Angular modes in ModeSet33 are used for DIMD if block's longer side is greater than Length_2 and less than or equal to Length_3; and
Angular modes in ModeSet65 are used for DIMD if block's longer side is greater than Length_3.

Example 3. The following mode assignments are made:
Angular mode in ModeSet9 is used for DIMD if block's longer side is less than or equal to Length_1;
Angular modes in ModeSet33 are used for DIMD if block's longer side is greater than Length_1 and less than or equal to Length_2; and
Angular modes in ModeSet65 are used for DIMD if block's longer side is greater than Length_2.

In the above examples, Length_1, Length_2, Length_3, Length_4 and Length_5 may be equal to 4×N samples, where N is a positive integer number.

In yet another example, when the block size criteria is the length of the shorter side of the block, the following mode assignments are made:
Angular modes in ModeSet0 are used for DIMD if block's shorter side is less than or equal to Length_1;
Angular modes in ModeSet9 are used for DIMD if block's shorter side is greater than Length_1 and less than or equal to Length_2;
Angular modes in ModeSet17 are used for DIMD if block's shorter side is greater than Length_2 and less than or equal to Length_3;
Angular modes in ModeSet33 are used for DIMD if block's shorter side is greater than Length_3 and less than or equal to Length_4;
Angular modes in ModeSet65 are used for DIMD if block's shorter side is greater than Length_4 and less than or equal to Length_5; and
Angular modes in ModeSet129 are used for DIMD if block's shorter side is greater than Length_5.

In the above examples, Length_1, Length_2, Length_3, Length_4 and Length_5 may be equal to 4×N samples, where N is a positive integer number.

In the above mode assignment structure, a few typically used area parameters are listed as follows:

TABLE 3

| Shorter side length (samples) | Modes assignments | | | | | |
|---|---|---|---|---|---|---|
| <=4 | 9 | 0 | 9 | 9 | 9 | 9 |
| =8 | 17 | 9 | 17 | 33 | 9 | 65 |
| =16 | 33 | 33 | 65 | 65 | 65 | 65 |
| =32 | 65 | 65 | 65 | 65 | 65 | 65 |
| >=64 | 65 | 65 | 65 | 65 | 65 | 65 |

A subset of the above combination can form a new set of Intra modes. Some examples are provided as follows:

Example 1. The following mode assignments are made:
Angular mode in ModeSet9 is used for DIMD if block's shorter side is less than or equal to Length_1;
Angular modes in ModeSet17 are used for DIMD if block's shorter side is greater than Length_1 and less than or equal to Length_2; and
Angular modes in ModeSet65 are used for DIMD if block's shorter side is greater than Length_2.

Example 2. The following mode assignments are made:
Angular mode in ModeSet9 is used for DIMD if block's shorter side is less than or equal to Length_1;
Angular modes in ModeSet17 are used for DIMD if block's shorter side is greater than Length_1 and less than or equal to Length_2;
Angular modes in ModeSet33 are used for DIMD if block's shorter side is greater than Length_2 and less than or equal to Length_3; and
Angular modes in ModeSet65 are used for DIMD if block's shorter side is greater than Length_3.

Example 3. The following mode assignments are made:
Angular modes in ModeSet9 are used for DIMD if block's shorter side is less than or equal to Length_1;
Angular modes in ModeSet33 are used for DIMD if block's shorter side is greater than Length_1 and less than or equal to Length_2; and
Angular modes in ModeSet65 are used for DIMD if block's shorter side is greater than Length_2.

Note that the above numbers of modes refer to the full set of possible modes that may be covered in the DIMD search. In some cases, some modes will be skipped in the search. For example, (Best_1+6) modes may not be checked after 3 rounds of searches. Also, in the following methods, when the current block is a non-square block, a different number of modes can be used on a longer or shorter side of the block to perform DIMD search. In the following examples, when it is said that N modes will be used for one side of a block in DIMD search, it means that the candidate modes on this side match those modes used for regular Intra prediction when a total number of modes used for the whole plane (on both sides) is N. For example, if for an 8×4 block, 65 modes will be used for the longer side while 9 modes will be used for shorter side. Therefore, the modes for the left side of Intra prediction using 9 angular modes (e.g. FIG. 20) will be checked for the side with length of 4 and the modes for the upper side of Intra prediction using 65 angular modes (e.g. FIG. 3) will be checked for the side with length of 8. In the above example for 8×4 block, the total modes used for the whole block for DIMD search is 32 (longer side)+1 (diagonal mode in the middle)+4 (shorter side)=37 modes.

The DIMD search can be in a hierarchical structure, in which the first round search covers a smaller set of angular modes (e.g. 9 modes) than the selected set of angular modes plus other non-angular modes. If there is a following round search (i.e., the selected set larger than the set of mode searched in the first round), a larger set of angular modes will be chosen to check in the following round. DIMD search terminates when the current search has covered the selected set of modes for this block size.

In another embodiment, if the first round has 9 angular modes and two non-angular modes, when doing the second round search, the set of Intra modes search is as follows:
If the total number of angular modes used in DIMD is 129, the encoder and decoder can search {Best_1+2, Best_1−2, Best_1+4, Best_1−4, Best_1+6, Best_1−6, Best_1+8, Best_1−8} for the second round. The modes in the third round to check can be {Best_2+1, Best_2−1} if the third round search is needed. Alternatively, {Best_1+4, Best_1−4, Best_1+8, Best_1−8} can be searched for the second round and {Best_2+2, Best_2−2} can be searched for the third round. Best_1 and Best_2 designate the best modes after the first round and the second round searches.

If the total number of angular modes used in DIMD is 65, the encoder and decoder can search {Best_1+1, Best_1−1, Best_1+2, Best_1−2, Best_1+3, Best_1−3, Best_1+4, Best_1−4} for the second round and no third round search is needed. Alternatively, {Best_1+2, Best_1−2, Best_1+4, Best_1−4} can be searched in the second round and {Best_2+1, Best_2−1} can be searched for the third round. Best_1 and Best_2 designate the best modes after the first round and the second round searches.

If the total number of modes used in DIMD is 17 mode, {Best_1+1, Best_1−1} can be searched for the second round and no third round search needed.

If the total number of modes used in DIMD is 33 mode, {Best_1−1, Best_1+1, Best_1−2, Best_1+2} can be searched for the second round and no third round search needed. Alternatively, {Best_1−2, Best_1+2} can be searched for the second round and {Best_2−1, Best_2+1} can be searched for the third round. Best_1 and Best_2 designate the best modes after the first round and the second round searches.

In the above methods for search around the best modes from last round search (such as Best_X+1, Best_X−1, etc.), when a total number of modes used in DIMD search is decided, Best_X+1 and Best_X−1 refer to the closest two angular modes next to the Best_X mode, X=1, 2, 3, etc. For example, if the total number of angular modes used is 17 (e.g. FIG. 21) and if Best_X mode is mode #6 (i.e., horizontal mode), Best_X−1 mode is mode #5 and Best_X+1 mode is mode #7. In another example, if the total number of angular modes used is 33 (e.g. FIG. 2) and if Best_X mode is mode H (horizontal mode), then Best_X−1 mode is mode H−1 and Best_X+1 mode is mode H+1.

In another method, for each side of the block, different sets of angular modes may be assigned to this side depending on the length on this side. In general, more modes will be checked for the longer side in DIMD search.

When the previous round DIMD search selects a best mode that falls into one side of the block (either top side or left side), the next round search may be skipped depending on the number of modes used on this side if the number of modes in previous round search is equal to the number of modes in the next round search for this side.

In one example, when the block area is 16 samples (e.g. 4×4 block) or when longer side of the block is 4, the number of angular modes in DIMD search is set to be 0. When block area is larger than 16, the number of angular modes in DIMD search is set to be 65. This is equivalent to disabling DIMD mode on 4×4 blocks. Here, a length of 4 is assumed to be the minimum length for either width or height of a block.

In another example, for side length larger than or equal to 8, the set of 65 modes is used in DIMD search. For side length smaller than 8, the set of 9 modes is used. Some examples according to this embodiment are shown below:

For 8×N or N×8 (N>=8) blocks, two rounds of searches are performed for DIMD.

For a 4×4 block, only one round of search is performed for DIMD.

For 4×N or N×4 (N>=8) blocks, when the best mode of first round search falls in the side with length of 4, no second round search since the first round search already checked 9 modes. An Intra mode falls in the height side or the height refers to the case that the Intra mode points toward the height side. For example, Intra modes 2, 3, 4, 5 and 6 fall in the height side. Similarly, Intra modes 7, 8, 9 and 10 fall in the width side. When the best mode of first round search falls in the side with length of 8, the second round search is performed. When the best mode of the first round search is the diagonal mode (e.g. 135 degree, mode #6 in FIG. 20), the candidates in the second round search along the side with length of 8 will be checked while those along the side with length of 4 will be skipped.

In another example, the following mode assignments are made:

Angular mode in ModeSet0 is used to a side with length less than or equal to Length_1;

Angular modes in ModeSet9 are used to a side with length greater than Length_1 and less than or equal to Length_2;

Angular modes in ModeSet17 are used to a side with length greater than Length_2 and less than or equal to Length_3;

Angular modes in ModeSet33 are used to a side with length greater than Length_3 and less than or equal to Length_4;

Angular modes in ModeSet65 are used to a side with length greater than Length_4 and less than or equal to Length_5; and Angular modes in ModeSet129 are used to a side with length is greater than Length_5.

A subset of the above combination can form a new set of Intra modes. Some examples are provided as follows:

Example 1. The following mode assignments are made:

Angular mode in ModeSet9 is used to a side with its length less than or equal to Length_1;

Angular modes in ModeSet17 are used to a side with its length greater than Length_1 and less than or equal to Length_2; and Angular modes in ModeSet65 are used to a side with its length greater than Length_2.

Example 2. The following mode assignments are made:

Angular mode in ModeSet9 is used to a side with its length less than or equal to Length_1;

Angular modes in ModeSet17 are used to a side with its length greater than Length_1 and less than or equal to Length_2;

Angular modes in ModeSet33 are used to a side with its length greater than Length_2 and less than or equal to Length_3; and Angular modes in ModeSet65 are used to a side with its length greater than Length_3.

Example 3. The following mode assignments are made:

Angular mode in ModeSet9 is used to a side with its length less than or equal to Length_1;

Angular modes in ModeSet33 are used to a side with its length greater than Length_1 and less than or equal to Length_2; and Angular modes in ModeSet65 are used to a side with its length greater than Length_2.

In the above examples, Length_1, Length_2, Length_3, Length_4 and Length_5 may be equal to 4×N samples, where N is a positive integer number. For the above embodiments, it can use the hierarchical search structure to implement.

In the above disclosed methods and embodiments, when no angular mode is used for DIMD search, the non-angular modes (e.g. DC and Planar modes) may or may not be used in DIMD search. In case the non-angular modes can be used, in one embodiment, the non-angular modes will be used always according to one embodiment. In another embodiment, a 1-bit flag is used to indicate if non-angular modes are to be used in DIMD search even no angular modes are used.

In the above methods, larger blocks measured by block area, block width/height or maximum or minimum of the width and height will use more angular modes in the DIMD search. In another method, a smaller number of angular modes for DIMD search may be used for a larger block when the block is large. The following table lists some examples of mapping between ModeSetX (X=0, 9, 17, etc.) and the number of angular modes used.

TABLE 4

| ModeSet Names | Modes assignments | | | |
| --- | --- | --- | --- | --- |
| ModeSet0 | 0 | 0 | 0 | 0 |
| ModeSet9 | 9 | 9 | 9 | 9 |
| ModeSet17 | 17 | 65 | 65 | 33 |
| ModeSet33 | 65 | 65 | 65 | 65 |
| ModeSet65 | 65 | 9 | 17 | 65 |
| ModeSet129 | 17 | 0 | 9 | 33 |
| ModeSet257 | 9 | 0 | 0 | 9 |

Figure 11:
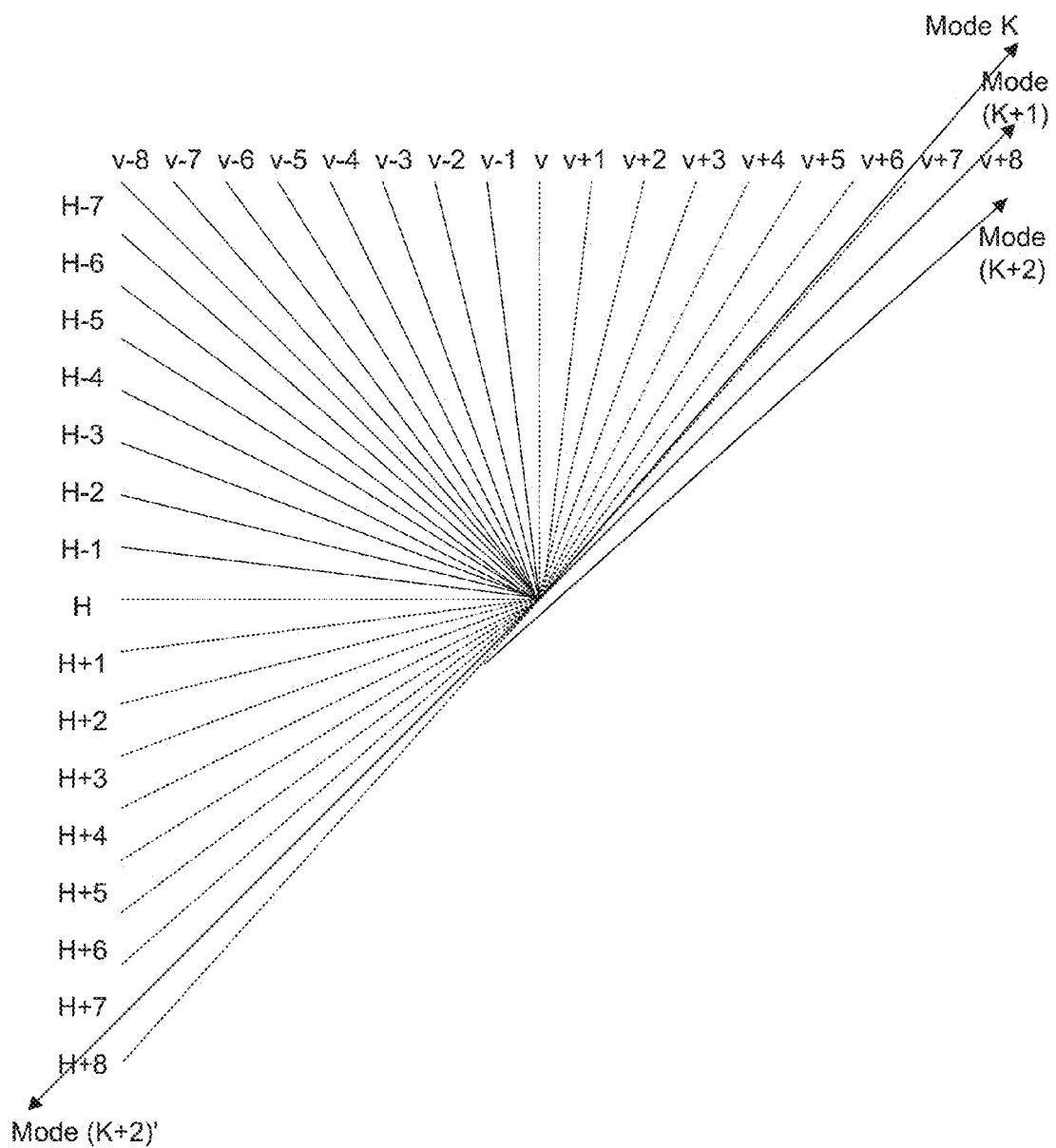
FIG. 11 illustrates an example of generating an Intra mode for an unavailable neighboring Intra mode, where an unavailable Intra mode (K+2) is replaced by mode (K+2)' by adding 180 degrees to mode (K+2).

In the above methods, when the neighboring modes near the Best_X modes are checked during the DIMD search, some of the modes may not be an available Intra prediction mode. If any of the modes is not available, this mode will be replaced by extending the original mode towards the reverse direction (i.e., the angle of original mode plus 180 degrees). For example, mode K+2 can be replaced by mode (K+2)', which is mode (K+2) rotated by 180 degrees as shown in FIG. 11. This operation is referred here as extended expression of Intra prediction mode. In another example, if the Best_X mode is H+8 (i.e., 225 degrees), Best_${X+}$1 mode is mode H+7. However, Best_X−1 mode is not available. In this case, Best_X−1 mode is replaced by mode V+7.

The inventions disclosed above can be incorporated into various video encoding or decoding systems in various forms. For example, the inventions can be implemented using hardware-based approaches, such as dedicated integrated circuits (IC), field programmable logic array (FPGA), digital signal processor (DSP), central processing unit (CPU), etc. The inventions can also be implemented using software codes or firmware codes executable on a computer, laptop or mobile device such as smart phones. Furthermore, the software codes or firmware codes can be executable on a mixed-type platform such as a CPU with dedicated processors (e.g. video coding engine or co-processor).

Figure 22:
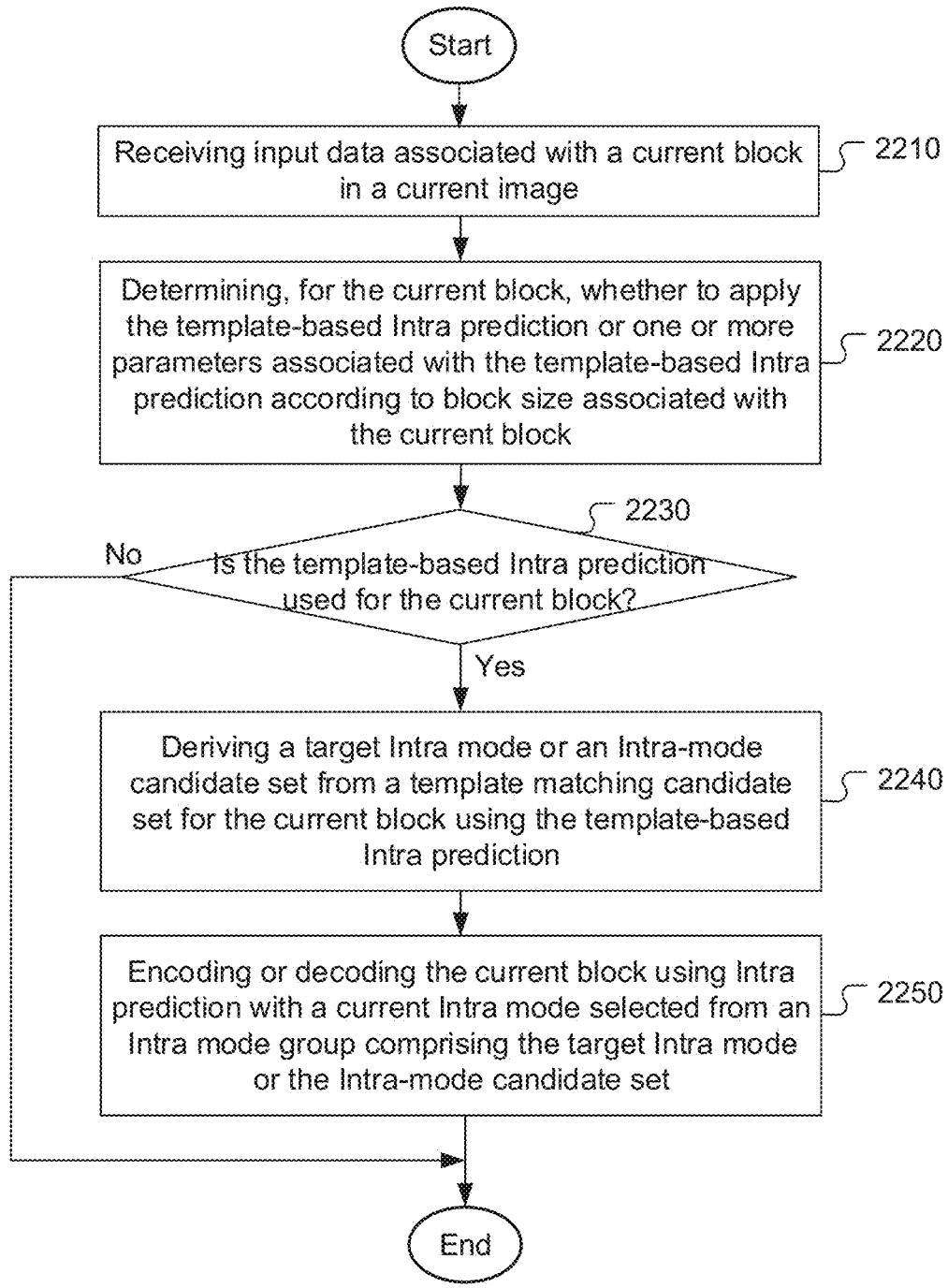
FIG. 22 illustrates a flowchart of an exemplary coding system with template-based Intra prediction enabled according to an embodiment of the present invention, where determining whether to apply the template-based Intra prediction or one or more parameters associated with the template-based Intra prediction depends on the current block size.

FIG. 22 illustrates a flowchart of an exemplary coding system with template-based Intra prediction enabled according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data associated with a current block in a current image are received in step 2910. At the encoder side, the input data may correspond to video data to be encoded. At the decoder side, the input data may correspond to compressed video data to be decoded. For the current block, determine whether to apply the template-based Intra prediction or one or more parameters associated with the template-based Intra prediction according to the current block size in step 2920. When one or more parameters associated with the template-based Intra prediction are determined, it implied that the template-based Intra prediction is used for the current block. Whether to apply the template-based Intra prediction to the current block is determined in step 2930. If the template-based Intra prediction is applied to the current block (i.e., the "Yes" path from step 2930), steps 2940 and 2950 are performed. If the template-based Intra prediction is not applied to the current block (i.e., the "No" path from step 2930), steps 2940 and 2950 are skipped. In step 2940, a target Intra mode or an Intra-mode candidate set is derived from a template matching candidate set for the current block using the template-based Intra prediction. In step 2950, the current block is encoded or decoded using Intra prediction with a current Intra mode selected from an Intra mode group comprising the target Intra mode or the Intra-mode candidate set.

Figure 23:
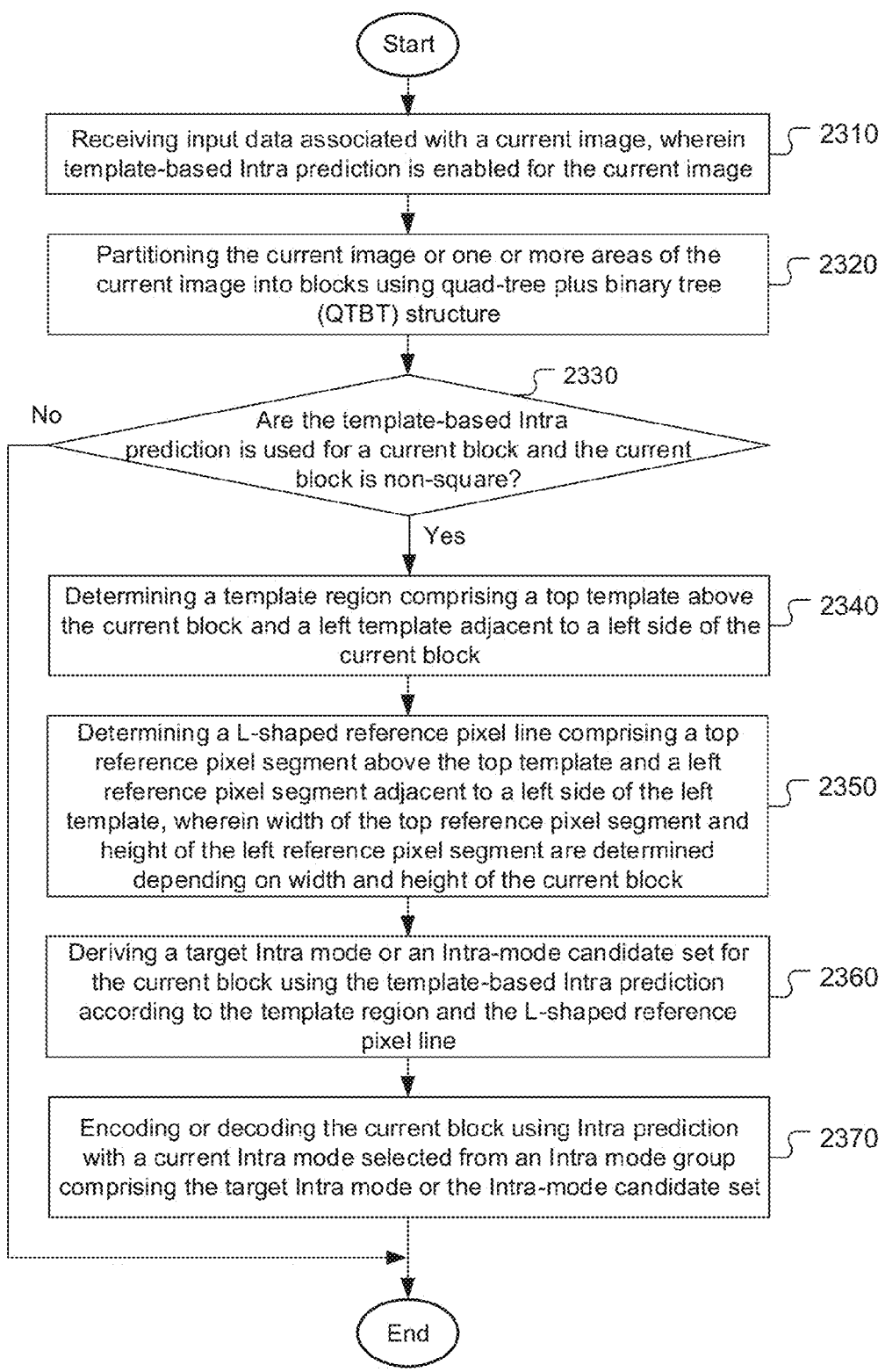
FIG. 23 illustrates a flowchart of an exemplary coding system with template-based Intra prediction enabled according to an embodiment of the present invention, where quad-tree plus binary tree (QTBT) structure is used to partition the image and width and height of the L-shaped reference line are determined based on the width and height of the current block when the width and height of the current block are not equal.

FIG. 23 illustrates a flowchart of an exemplary coding system with template-based Intra prediction enabled according to an embodiment of the present invention, where quad-tree plus binary tree (QTBT) structure is used to partition the image and width and height of the L-shaped reference line are determined based on the width and height of the current block when the width and height of the current block are not equal. According to this method, input data associated with a current image is received in step 2310, where template-based Intra prediction is enabled for the current image. The current image or one or more areas of the current image are partitioned into blocks using quad-tree plus binary tree (QTBT) structure in step 2320. The areas of the current image may correspond to slices, tiles, LCU rows or LCUs. Whether the template-based Intra prediction is used for a current block and the current block is non-square having block width Width_b and block height Height_b with Width_b unequal to Height_b are checked in step 2330. If the result is "Yes", steps 2340 to 2370 are performed. If the result is "No", steps 2340 to 2370 are skipped. In step 2340, a template region comprising a top template above the current block and a left template adjacent to a left side of the current block is determined. In step 2350, a L-shaped reference pixel line comprising a top reference pixel segment above the top template and a left reference pixel segment adjacent to a left side of the left template are determined, where width of the top reference pixel segment designated as Width_reference and height of the left reference pixel segment designated as Height_reference are determined depending on Height_b and Width_b with unequal values. In step 2560, a target Intra mode or an Intra-mode candidate set for the current block is derived using the template-based Intra prediction according to the template region and the L-shaped reference pixel line. In step 2570, the current block is encoded or decoded using Intra prediction with a current Intra mode selected from an Intra mode group comprising the target Intra mode or the Intra-mode candidate set.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding and decoding used by a video encoding system and video decoding system respectively, the method comprising:
   receiving input data associated with a current block in a current image, wherein template-based Intra prediction is enabled for the current image;
   determining, for the current block, whether to apply the template-based Intra prediction or one or more parameters associated with the template-based Intra prediction according to block size associated with the current block; and
   if the template-based Intra prediction is used for the current block:
      deriving a target Intra mode or an Intra-mode candidate set from a template matching candidate set for the current block using the template-based Intra prediction; and
      encoding or decoding the current block using Intra prediction with a current Intra mode selected from an Intra mode group comprising the target Intra mode or the Intra-mode candidate set.

2. The method of claim 1, wherein said one or more parameters associated with the template-based Intra prediction are selected from a group comprising an Intra mode set searched by the template-based Intra prediction, a set size associated with the Intra mode set and a total number of iterations to apply the template-based Intra prediction.

3. The method of claim 1, wherein the template-based Intra prediction is applied to the current block if the block size is greater than a minimum block size.

4. The method of claim 3, wherein the block size is measured as a longer side, a shorter side or an area of the current block.

5. The method of claim 3, wherein the template-based Intra prediction is disabled for the current block if the current block is a 4×4 block.

6. The method of claim 1, wherein the template-based Intra prediction with a total of 11 Intra modes is applied to the current block if the current block is a 4×4 block.

7. The method of claim 1, wherein the current block is a 4×N or N×4 block with N being an integer greater than or equal to 8 and the template-based Intra prediction is applied to the current block; and wherein if a best Intra mode derived according to the template-based Intra prediction falls in a shorter side of the current block, only one-round of template-based Intra prediction is applied to the current block.

8. The method of claim 1, wherein a total number of Intra modes searched by the template-based Intra prediction depends on the block size and the block size is measured as a longer side, a shorter side or an area of the current block.

9. The method of claim 1, wherein different Intra mode sets are searched by the template-based Intra prediction according to a block length measured as a width, height, maximum of width and height, or minimum of width and height of the current block.

10. The method of claim 9, wherein set sizes associated with the different Intra mode sets searched by the template-based Intra prediction are 9, 33, 9 and 131 for the block length being 4, 8, 64 and other block lengths respectively.

11. The method of claim 1, wherein the Intra-mode candidate set consisting of N Intra-mode candidates are derived based on the template-based Intra prediction, and wherein the N Intra-mode candidates correspond to N lowest-cost Intra modes within an Intra mode set searched by the template-based Intra prediction.

12. The method of claim 11, wherein a final Intra mode is selected for the current block from the N Intra-mode candidates by explicitly signaling or parsing a syntax corresponding to the final Intra mode.

13. The method of claim 1, wherein an initial Intra mode is signaled or parsed and the template-based Intra prediction derives a final Intra mode for the current block by searching a set of Intra modes around the initial Intra mode.

14. The method of claim 1, wherein all available Intra modes for the current block are divided into groups and an index is signaled or parsed to select a group as an Intra mode set, and wherein a final Intra mode is determined from the Intra mode set by using the template-based Intra prediction to search the Intra mode set.

15. An apparatus for video encoding and decoding used by a video encoding system and video decoding system respectively, the apparatus comprising one or more electronic circuits or processors arranged to:

receive input data associated with a current block in a current image, wherein template-based Intra prediction is enabled for the current image;

determine whether to apply the template-based Intra prediction to the current block or determining one or more parameters associated with the template-based Intra prediction to apply to the current block according to block size associated with the current block; and if the template-based Intra prediction is used for the current block:

derive a target Intra mode or an Intra-mode candidate set from a template matching candidate set for the current block using the template-based Intra prediction; and encode or decode the current block using Intra prediction with a current Intra mode selected from an Intra mode group comprising the target Intra mode or the Intra-mode candidate set.

16. A method of video encoding and decoding used by a video encoding system and video decoding system respectively, the method comprising:

receiving input data associated with a current image, wherein template-based Intra prediction is enabled for the current image;

partitioning the current image or one or more areas of the current image into blocks using quad-tree plus binary tree (QTBT) structure;

if the template-based Intra prediction is used for a current block and the current block is non-square having block width Width_b and block height Height_b with Width_b unequal to Height_b:

determining a template region comprising a top template above the current block and a left template adjacent to a left side of the current block;

determining a L-shaped reference pixel line comprising a top reference pixel segment above the top template and a left reference pixel segment adjacent to a left side of the left template, wherein width of the top reference pixel segment designated as Width_reference and height of the left reference pixel segment designated as Height_reference are determined depending on Height_b and Width_b with unequal values;

deriving a target Intra mode or an Intra-mode candidate set for the current block using the template-based Intra prediction according to the template region and the L-shaped reference pixel line; and encoding or decoding the current block using Intra prediction with a current Intra mode selected from an Intra mode group comprising the target Intra mode or the Intra-mode candidate set.

17. The method of claim 16, wherein Width_reference and Height_reference are determined according to:

Width_reference=Width_$b$+Height_$b$+template_size+1,

Height_reference=Height_$b$+Width_$b$+template_size+1, and wherein template_size corresponds to height of the top template and width of the left template.

18. The method of claim 16, wherein Width_reference and Height_reference are determined according to:

Width_reference=Width_$b$+Height_$b$+template size*2+1,

Height_reference=Height_$b$+Width_$b$+template size*2+1, and wherein template_size corresponds to height of the top template and width of the left template.

19. The method of claim 16, wherein Width_reference and Height_reference are determined according to:

Width_reference=2*(Width_$b$+template size)+1,

Height_reference=2*(Height_$b$+template size)+1, and wherein template_size corresponds to height of the top template and width of the left template.

20. The method of claim 16, wherein Width_reference and Height_reference are determined according to:

Width_reference=2*(Width_$b$)+template size+1,

Height_reference=2*(Height_$b$)+template size+1, and wherein template_size corresponds to height of the top template and width of the left template.

21. The method of claim 16, wherein Width_reference and Height_reference are determined according to:

Width_reference=Width_$b$+Height_$b$+1,

Height_reference=Width_$b$+Height_$b$+1, and wherein template_size corresponds to height of the top template and width of the left template.

22. An apparatus for video encoding and decoding used by a video encoding system and video decoding system respectively, the apparatus comprising one or more electronic circuits or processors arranged to:

receive input data associated with a current image, wherein template-based Intra prediction is enabled for the current image;

partition the current image or one or more areas of the current image into blocks using quad-tree plus binary tree (QTBT) structure;

if the template-based Intra prediction is used for a current block and the current block is non-square having block width Width_b and block height Height_b with Width_b unequal to Height_b:

determine a template region comprising a top template above the current block and a left template adjacent to a left side of the current block;

determine a L-shaped reference pixel line comprising a top reference pixel segment above the top template and a left reference pixel segment adjacent to a left side of the left template, wherein width of the top reference pixel segment designated as Width_reference and height of the left reference pixel segment designated as Height_reference are determined depending on Height_b and Width_b with unequal values;

derive a target Intra mode or an Intra-mode candidate set for the current block using the template-based Intra prediction according to the template region and the L-shaped reference pixel line; and encode or decode the current block using Intra prediction with a current Intra mode selected from an Intra mode group comprising the target Intra mode or the Intra-mode candidate set.

* * * * *